(12) United States Patent
King

(10) Patent No.: US 8,508,135 B2
(45) Date of Patent: Aug. 13, 2013

(54) USER INTERFACE FOR AN INDOOR LIGHT SWITCH

(76) Inventor: John Joseph King, Wheaton, IL (US)

( * ) Notice: Subject to any disclaimer, the term of this patent is extended or adjusted under 35 U.S.C. 154(b) by 312 days.

(21) Appl. No.: 13/018,463

(22) Filed: Feb. 1, 2011

(65) Prior Publication Data
US 2012/0194102 A1 Aug. 2, 2012

(51) Int. Cl.
*H05B 37/02* (2006.01)
(52) U.S. Cl.
USPC ............ 315/149; 307/117; 315/360; 315/362
(58) Field of Classification Search
USPC .................. 315/134, 149, 360, 362; 307/112, 307/117, 139
See application file for complete search history.

(56) References Cited

U.S. PATENT DOCUMENTS

| | | | |
|---|---|---|---|
| 4,521,843 A | 6/1985 | Pezollo et al. | |
| 5,046,157 A | 9/1991 | Smith et al. | |
| 5,160,853 A | 11/1992 | Simon et al. | |
| 5,191,265 A | 3/1993 | D'Alea et al. | |
| 5,442,177 A | 8/1995 | Boulos et al. | |
| 5,831,391 A * | 11/1998 | MacKay | 315/159 |
| 5,867,099 A * | 2/1999 | Keeter | 340/567 |
| 5,949,200 A | 9/1999 | Ference et al. | |
| 5,962,989 A | 10/1999 | Baker | |
| 5,990,471 A | 11/1999 | Watanabe | |
| 6,120,165 A | 9/2000 | Shalvi | |
| 6,121,889 A | 9/2000 | Janda et al. | |
| 6,169,377 B1 * | 1/2001 | Bryde et al. | 315/294 |
| 6,658,303 B2 | 12/2003 | Hatemala et al. | |
| 6,888,323 B1 * | 5/2005 | Null et al. | 315/294 |
| 6,958,584 B2 | 10/2005 | Nakamura et al. | |
| 6,965,801 B2 | 11/2005 | Hall | |
| 7,255,596 B2 | 8/2007 | Pyrros | |
| 7,382,100 B2 | 6/2008 | Johnson et al. | |
| 7,405,524 B2 * | 7/2008 | Null et al. | 315/308 |
| 7,436,132 B1 | 10/2008 | Null | |
| 7,575,470 B2 | 8/2009 | Pyrros | |
| 7,579,717 B2 | 8/2009 | Blair et al. | |
| 7,628,643 B2 | 12/2009 | Pyrros | |
| 7,689,875 B2 | 3/2010 | Cahill et al. | |
| 7,694,005 B2 | 4/2010 | Renkamp et al. | |
| 7,859,136 B2 * | 12/2010 | Blair et al. | 307/141 |
| 7,863,829 B2 | 1/2011 | Sayers et al. | |
| 8,054,175 B2 | 11/2011 | Kato et al. | |
| 8,084,700 B1 * | 12/2011 | Massaro et al. | 200/38 R |
| 8,223,508 B2 | 7/2012 | Baarman et al. | |
| 8,242,714 B2 * | 8/2012 | Weightman et al. | 315/307 |
| 2004/0260853 A1 | 12/2004 | Cho | |
| 2006/0125324 A1 | 6/2006 | Lai Lui | |
| 2006/0239123 A1 | 10/2006 | Chen | |
| 2006/0250745 A1 | 11/2006 | Butler et al. | |

(Continued)

OTHER PUBLICATIONS

3COM IEEE 802.11 Wireless LANs, Jan. 2000, 14 pages.

(Continued)

*Primary Examiner* — Thuy Vinh Tran

(57) ABSTRACT

A user interface for an indoor light switch coupled to control an outdoor light having a sensor for controlling an on/off state of the outdoor light is disclosed. The user interface comprises a mode actuator moveable between an off position and a sensor position; and a control actuator enabling an adjustment of a setting of the sensor from the user interface, wherein the setting of the control actuator will affect the on/off state of the outdoor light when the mode actuator is in the sensor position.

20 Claims, 21 Drawing Sheets

(56) References Cited

U.S. PATENT DOCUMENTS

| | | |
|---|---|---|
| 2008/0229125 A1 | 9/2008 | Lin et al. |
| 2009/0190443 A1 | 7/2009 | Huizi et al. |
| 2009/0225811 A1 | 9/2009 | Albert et al. |
| 2009/0273243 A1 | 11/2009 | Blair et al. |
| 2010/0025210 A1* | 2/2010 | Simard et al. ............... 200/33 R |
| 2010/0052487 A1 | 3/2010 | Stein |
| 2011/0018448 A1 | 1/2011 | Metchear, III et al. |

OTHER PUBLICATIONS

GE Digital Time Switch, Nov. 24, 2009, 2 pages.
Schlage LiNK RP200 Light Module, Rev. 03/09, (2 pages).
Heath/Zenith Motion Sensor Light Control Model SL-5408, 2004.
Leviton Indoor Plug-in Timer, PK-93694-10-00-2A, 2010.
Tork Digital Time Switch Instruction Manual, DZM200 BP, Mar. 27, 2007.
Tork Digital Lighting Control Instruction Manual, DLC400BP, Jun. 1, 2007.
Aube Technologies T1003 Installation and Instruction Guide Programmable Wall Switch, Nov. 30, 2006.
Intermatic Model STO1 Series Self-Adjusting Wall Switch Timer, Installation and User Instructions, 2 pages, printed on Jul. 30, 2010.
GE 7 Day Digital Timer User Instructions, 1 page, printed on Jul. 30, 2010.
Smartlink INSTE ON Central Controller Smarthome, 5 pages, printed on Jun. 30, 2010.
Intermatic Model E1600 Self-Adjusting Wall Switch Timer, Installation nad User Instructions, 2 pages, Jul. 2009.
GE Outdoor Plug-In Time Switches, GE Eight-Hour, Two-Outlet Mechanical Countdown Timer, Nov. 24, 2009.
Honeywell RPLs540A/RPLS541 User Guide, 8 pages, May 17, 2010.

* cited by examiner

Timing Characterization

Standard Time

| Day | On | | Off | |
|---|---|---|---|---|
| MON | 08:00 | ○ AM / ● PM | 05:00 | ● AM / ○ PM |
| TUE | 08:00 | ○ AM / ● PM | 05:00 | ● AM / ○ PM |
| WED | 08:00 | ○ AM / ● PM | 05:00 | ● AM / ○ PM |
| THU | 08:00 | ○ AM / ● PM | 05:00 | ● AM / ○ PM |
| FRI | 08:00 | ○ AM / ● PM | 05:00 | ● AM / ○ PM |
| SAT | 09:00 | ○ AM / ● PM | 05:00 | ● AM / ○ PM |
| SUN | 09:00 | ○ AM / ● PM | 05:00 | ● AM / ○ PM |

Daylight Savings Time

| Day | On | | Off | |
|---|---|---|---|---|
| MON | 05:00 | ○ AM / ● PM | 06:00 | ● AM / ○ PM |
| TUE | 05:00 | ○ AM / ● PM | 06:00 | ● AM / ○ PM |
| WED | 05:00 | ○ AM / ● PM | 06:00 | ● AM / ○ PM |
| THU | 05:00 | ○ AM / ● PM | 06:00 | ● AM / ○ PM |
| FRI | 05:00 | ○ AM / ● PM | 06:00 | ● AM / ○ PM |
| SAT | 05:00 | ○ AM / ● PM | 06:00 | ● AM / ○ PM |
| SUN | 05:00 | ○ AM / ● PM | 06:00 | ● AM / ○ PM |

[Back]  [Next]

FIG. 28

Timing Characterization

A Characterization

| Day | On | | Off | |
|-----|-----|-----|-----|-----|
| MON | 05:00 | ○ AM / ● PM | 06:00 | ● AM / ○ PM |
| TUE | 05:00 | ○ AM / ● PM | 06:00 | ● AM / ○ PM |
| WED | 05:00 | ○ AM / ● PM | 06:00 | ● AM / ○ PM |
| THU | 05:00 | ○ AM / ● PM | 06:00 | ● AM / ○ PM |
| FRI | 05:00 | ○ AM / ● PM | 06:00 | ● AM / ○ PM |
| SAT | 05:00 | ○ AM / ● PM | 06:00 | ● AM / ○ PM |
| SUN | 05:00 | ○ AM / ● PM | 06:00 | ● AM / ○ PM |

B Characterization

| Day | On | | Off | |
|-----|-----|-----|-----|-----|
| MON | 08:00 | ○ AM / ● PM | 05:00 | ● AM / ○ PM |
| TUE | 08:00 | ○ AM / ● PM | 05:00 | ● AM / ○ PM |
| WED | 08:00 | ○ AM / ● PM | 05:00 | ● AM / ○ PM |
| THU | 08:00 | ○ AM / ● PM | 05:00 | ● AM / ○ PM |
| FRI | 08:00 | ○ AM / ● PM | 05:00 | ● AM / ○ PM |
| SAT | 09:00 | ○ AM / ● PM | 05:00 | ● AM / ○ PM |
| SUN | 09:00 | ○ AM / ● PM | 05:00 | ● AM / ○ PM |

[ Back ]  [ Next ]

FIG. 29-A

Timing Characterization

C-Characterization

| Day | On | | Off | |
|---|---|---|---|---|
| MON | 05:00 | ○ AM / ● PM | 08:00 | ● AM / ○ PM |
| TUE | 05:00 | ○ AM / ● PM | 08:00 | ● AM / ○ PM |
| WED | 05:00 | ○ AM / ● PM | 08:00 | ● AM / ○ PM |
| THU | 05:00 | ○ AM / ● PM | 08:00 | ● AM / ○ PM |
| FRI | 05:00 | ○ AM / ● PM | 08:00 | ● AM / ○ PM |
| SAT | 05:00 | ○ AM / ● PM | 09:00 | ● AM / ○ PM |
| SUN | 05:00 | ○ AM / ● PM | 09:00 | ● AM / ○ PM |

D-Characterization

| Day | On | | Off | |
|---|---|---|---|---|
| MON | 03:00 | ○ AM / ● PM | 10:00 | ● AM / ○ PM |
| TUE | 03:00 | ○ AM / ● PM | 10:00 | ● AM / ○ PM |
| WED | 03:00 | ○ AM / ● PM | 10:00 | ● AM / ○ PM |
| THU | 03:00 | ○ AM / ● PM | 10:00 | ● AM / ○ PM |
| FRI | 03:00 | ○ AM / ● PM | 10:00 | ● AM / ○ PM |
| SAT | 03:00 | ○ AM / ● PM | 10:00 | ● AM / ○ PM |
| SUN | 03:00 | ○ AM / ● PM | 10:00 | ● AM / ○ PM |

Back    Next

FIG. 29-B

USER INTERFACE FOR AN INDOOR LIGHT SWITCH

FIELD OF THE INVENTION

The present invention relates generally to outdoor lights, and in particular, to a user interface of an indoor light switch.

BACKGROUND OF THE INVENTION

Some conventional outdoor lights have sensors to implement motion detection or dusk-to-dawn lighting operation, for example. However, such outdoor lights either provide limited functionality, or are difficult to operate as desired. Because the controls of conventional outdoor lights are located with the outdoor light itself, adjusting a feature or function of the light can be difficult. When it is difficult to change a feature or function of a light, the light is often operated without the appropriate or desirable settings. For example, a motion detector associated with an outdoor light may have to be set to detect motion in certain locations. Because outdoor lights are often used as security lights, it is important that the lights operate as intended in order to provide the desired security feature.

Because a light having a dusk-to-dawn feature must switch at some level of light which is greater than complete darkness in order to compensate for natural lighting occurrences such as moonlight, outdoor lights implementing dusk-to-dawn features must inherently be turned on when it is light out. Further, because an outdoor light implementing a dusk-to-dawn feature may operate for an extended period of time, it may be beneficial to limit the amount of time that the light is on. That is, conventional outdoor lights having dusk-to-dawn features may operate during a fixed time period based upon the sensitivity of a sensor. As a result, the outdoor light may operate during times which may not be beneficial.

As the number of people using outdoor lights for either aesthetic or security purposes increases, and those people rely on sensors to automatically turn on and off the outdoor lights, it is important that the outdoor light sensors operate as desired. Efficiently operating an outdoor light is important to reducing energy consumption. Such a reduction in energy consumption is not only beneficial to individuals from a cost standpoint, but also reduces the environmental impact of energy production and consumption required by the light. Without an effective user interface for an outdoor light for example, the light may be on significantly longer than necessary, which will not only waste energy, but in many cases increase pollution through unnecessary energy consumption and discarded light bulbs. Any reduction in energy consumption and the pollution which could be achieved by improved control of outdoor lights would have a compounding effect if implemented on a large scale.

SUMMARY OF THE INVENTION

A user interface for an indoor light switch coupled to control an outdoor light having a sensor for controlling an on/off state of the outdoor light is disclosed. The user interface comprises a mode actuator moveable between an off position and a sensor position; and a control actuator enabling an adjustment of a setting of the sensor from the user interface, wherein the setting of the control actuator will affect the on/off state of the outdoor light when the mode actuator is in the sensor position.

The user interface may further comprise a control circuit coupled to the mode actuator, the control circuit comprising an encoder for generating control signals based upon signals from the mode actuator. The encoder of the control circuit may be coupled the control signals to a decoder at the outdoor light. The user interface may further comprise a control circuit having a decoder coupled to receive control signals from the sensor, wherein the control signals from the sensor comprise encoded signals generated at an encoder at the outdoor light. The mode control signal may be further movable to an on position. Further, the control actuator may comprise an actuator for setting an amount of time that the outdoor light is on in response to a signal from the sensor.

According to an alternate embodiment, the user interface for an indoor light switch coupled to control an outdoor light having a sensor for controlling an on/off state of the outdoor light comprises a mode actuator moveable between an off position, a sensor position, and an on position, wherein the mode actuator enables overriding the sensor when the mode actuator is moved to the on position; and a control actuator enabling an adjustment of a setting of the sensor, wherein the setting of the control actuator will affect the on/off state of the outdoor light when the mode actuator is in the sensor mode position.

The user interface may further comprise a control circuit coupled to the mode actuator and the control actuator, wherein the control circuit may comprise an encoder for generating control signals based upon signals from the mode actuator and the control actuator. The encoder of the control circuit may be coupled to a decoder at the outdoor light. The user interface may further comprise a control circuit having a decoder coupled to receive control signals from the outdoor light. The control circuit may further be coupled to an encoder at the outdoor light, the encoder generating a sensor status signal at the outdoor light. The sensor may comprise a motion detector or an ambient light detector.

According to a further embodiment, a user interface for an indoor light switch coupled to control an outdoor light having a sensor for controlling an on/off state of the outdoor light comprises a mode actuator moveable between an off position and a sensor position; a first control actuator enabling an adjustment of the sensitivity of the sensor, wherein the adjustment of the sensitivity of the sensor will affect turning on the outdoor light when the mode actuator is in the sensor position; and a second control actuator enabling an adjustment of the duration of an on time of the outdoor light when the mode actuator is in the sensor position.

The user interface may further comprise a control circuit coupled to the mode actuator and the control actuator, wherein the control circuit comprises an encoder for generating control signals based upon input from the mode actuator and the control actuator. The encoder of the control circuit may be coupled to a decoder at the outdoor light. The user interface may further comprise a control circuit having a decoder coupled to receive control signals from the sensor. The control circuit may be coupled to an encoder at the outdoor light, the encoder generating a sensor status signal. The mode control signal may further be movable to an on position.

BRIEF DESCRIPTION OF THE DRAWINGS

FIG. 28 is a program screen enabling the entry of timing characterization data by a computer for a daylight savings feature when implementing a light timer according to an embodiment of the present invention;

FIGS. 29A and 29B are program screens enabling the entry of multiple sets of timing characterization data when implementing a light timer according to an embodiment of the present invention;

DETAILED DESCRIPTION OF THE DRAWINGS

Figure 1:
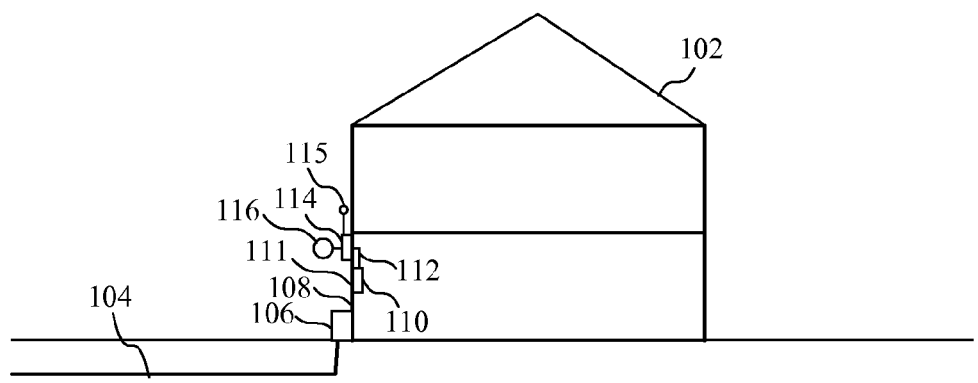
FIG. 1 shows an arrangement of an outdoor light and corresponding indoor user interface according to an embodiment of the present invention.
Figure 2:
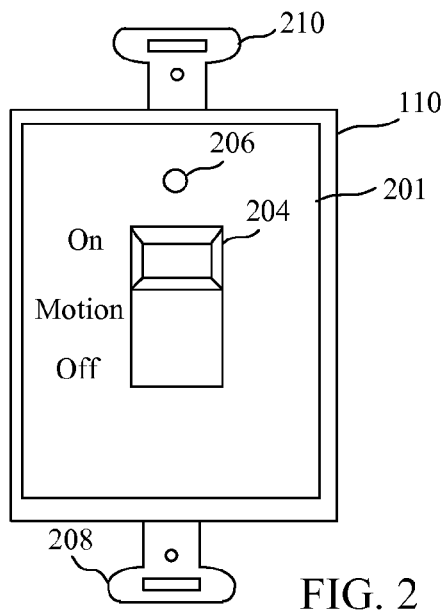
FIG. 2 is a perspective view of a front panel of an indoor portion of a light arrangement comprising a user interface adapted to control a motion detection feature of an outdoor light according to a embodiment of the present invention.

Turning first to FIG. 1, a block diagram of an arrangement of an outdoor light and corresponding indoor user interface according to an embodiment of the present invention is shown. A building 102 receiving a source of power from a power line 104 coupled to an electric box 106 for supplying power to the building 102. The building 102 may comprise various lighting elements at various locations, both internal and external. While the circuits, user interfaces and methods set forth below find particular application with outdoor lights, they may also be used with indoor lights where a sensor or a user interface for controlling a sensor may not be easily accessible. The lights of the building of FIG. 2 are powered by electrical wiring 108 represented in FIG. 1 by the framing of the building as shown. A switch 110 on an inside of a wall 111 is coupled, by way of wiring elements 112 in the wall, to an outdoor light 114 which may be attached to the wall 111 as an outdoor light fixture. The switch 110 may be implemented as in a wall switch and located in a conventional junction box associated with the electrical wiring 108. The switch 110 comprises a user interface which enables control of the operation of the outdoor light 114. As will be described in more detail below, the user interface associated with the switch 110 enables a user of the outdoor light to control the operation of the sensor 115 which will control the on/off state of the light bulb 116. While the particular arrangement of lights and switches are shown in conjunction with the building 102 by way of example in FIG. 1 for purposes of explanation, it should be understood that other arrangements of and additional lights and user interfaces as described below could be employed.

The methods, circuits and user interfaces of the present invention provide significant benefits in terms of improved functionality of an outdoor light and reduced energy consumption. A unique circuit arrangement enables changing modes of operation of an outdoor light which is normally set to turn on and off in response to an external stimulus (e.g. motion or an ambient light level). While some conventional outdoor lights are set to turn on based upon external stimulus, the circuits and methods set forth below enable setting modes from a user interface inside, and in some situations, overriding functions normally responsive to an external sensor. That is, while a conventional on/off switch may apply power to an outdoor light, or conventional motion or ambient light sensors may change the state of the outdoor light, the methods, circuits and user interfaces enable improved flexibility, reduced power consumption and reduced waste.

Conventional wiring only allows power to be applied to an outdoor light. While timers located at the light switch inside of a building may be used to control power to the outdoor light, a motion detector or an ambient light sensor is located with the outdoor light in order respond to a particular condition (i.e. motion or light) at the outdoor light. Accordingly, conventional outdoor lights also have controls for the motion detector located outdoor with the light itself. Such an arrangement is inconvenient because it requires a user has to go outside to make a change. In cases where an outdoor light is difficult to access (e.g. requiring a ladder), the change is even more inconvenient. In any case, an outdoor light having sensor functionality which is used for security purpose may also susceptible to tampering if the sensor or other controls are located outside with the outdoor light.

The circuit arrangement of the present invention not only makes it easier for a user to change a setting of an outdoor light having sensing capability, but safer by preventing a user from having to go outside to manually turn on a light. Accordingly, the various embodiments set forth below enable a user to not only override the sensor from inside, but also to set the settings of the sensor from inside. For example, a user may want to turn on a light which is normally operated by a motion detector to determine whether an unauthorized person is outside. That user would be reluctant to go outside to turn on the light (e.g. engaging the motion detector of the light) to determine whether an unauthorized person is in the area. Such a case may exist when an unauthorized person has blocked the motion detector so that the motion of an unauthorized person won't be detected. As will be apparent in the following specific embodiments, the improved control and operation of outdoor lights having sensors not only reduces energy consumption, but improves security.

Turning now to FIG. 2, a perspective view of a front panel of an indoor portion of a light arrangement comprising a user interface adapted to control a motion detector feature of an outdoor light according to a embodiment of the present invention is shown. In particular, the switch 110 comprises a user interface 201 having a mode actuator 204. The mode actuator 204 is movable between an off position (for blocking power to the outdoor light), a sensor position (such as a motion position for enable the outdoor light to operate in response to the sensor 115 comprising a motion detector), and an on position. In the on position, the mode actuator 204 enables overriding the motion detector to turn the light on. That is, rather than just applying power to the light so that the light will be responsive to the motion detector, one or more control circuits associated with the light to enable the light to be turned on in response to user input rather than only turned on in response to the motion detector. There are a number of situations when a user may desire to override the motion detector and turn the light on. For example, if a user is concerned that an intruder is in the area covered by the motion detector, but is waiting for the light to go off and to avoid the motion detector, the user can simply turn the light on. Further, there may be situations, such as during a party in the evening, when the user may desire to use the outdoor light for general purpose lighting. That is, rather than having to change the setting on the light, the user may simply turn the light on from the user interface.

A feedback portion, comprising a status indicator light 206 according to the embodiment of FIG. 2, enables a user to determine a status of the outdoor light. The status indicator light could be a multicolor light emitting diode (LED), for example. As will be described in more detail below, the on/off state of the light will be controlled in response to a signal generated at the user interface to enable the light to be turned on regardless of the status of the motion detector.

Figure 3:
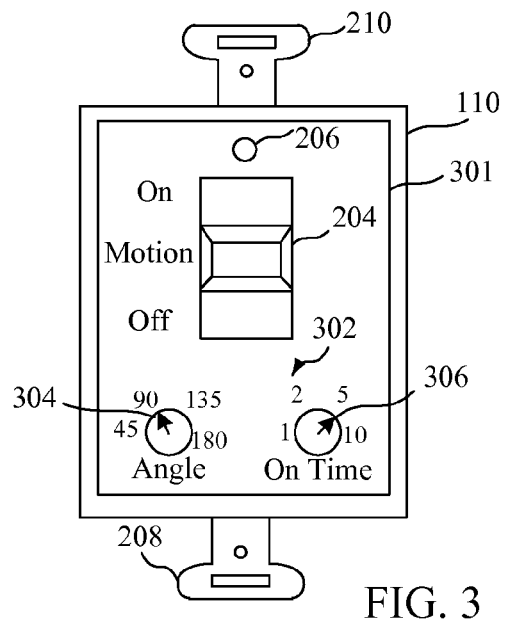
FIG. 3 is a perspective view of a front panel of an indoor portion of a light arrangement comprising a user interface having control actuators adapted to control a motion detection feature of an outdoor light according to a embodiment of the present invention.

Turning now to FIG. 3, a perspective view of a front panel of an indoor portion of a light arrangement comprising a user interface having control actuators adapted to control a motion detection feature of an outdoor light is shown. In addition to the mode actuator 204 (which is shown in FIG. 3 in the motion position for enabling the light to operate in response to the motion detector), a first control actuator 304 comprises an actuator for setting a detection angle of the motion detector. For example, the first control actuator 304 is movable between four settings, shown in FIG. 3 as 45 degrees, 90 degrees, 135 degrees, and 180 degrees, where the settings represent the range extending out from the sensor through which a moving object will be detected. Depending upon the location or the use of light having the motion detector, the light may function best with a certain angle setting for the motion detector. For example, if the angle of detection is too wide, the motion detector may unnecessarily detect the motion of a neighbor's dog in an adjacent yard.

However, such an undesirable situation would not be recognized until the light is installed and operating for a period of time. If a control actuator for controlling an angle of operation of a motion detector or some other feature of the outdoor light is located with the light itself, a user would not only have to go outside to adjust the setting of the control actuator, but may need to get on a ladder to adjust the setting of the control actuator. Given the nature of the angle of detection of a motion detector, it may not be possible to immediately determine whether the adjustment of the angle of detection results in a correct angle of detection. In such a case, the user may have to again adjust the setting of the control actuator and proceed with another trial period of the outdoor light.

Further, while control actuator settings may be adequate after initial settings are found, a user may be required to change control actuator settings periodically. For example, environmental elements which may affect a motion detector may vary based upon seasons, such as a tree branch only with leaves which would activate the motion detector, or may first occur at a later period of time, such as when a new tree which is planted. Accordingly, the ability to change a setting of a control actuator from a user interface which is easily accessible is desirable for a user.

The user interface 301 of FIG. 3 further comprises an on-time control actuator 306 which enables the user to establish how long the light will remain on after the motion detector is activated (when the mode actuator 204 is in the motion position). In some circumstances, wildlife may be detected by the motion detector, leading to the light be activated somewhat frequently. In such a case, the user may desire that the on-time is set for a short period of time. In contrast, if the light is used in a fenced in yard and the motion detector would only be actuated when an intruder were in the back yard, the user of the light may desire to set the on-time actuator to the maximum on time. As should be apparent, the first control actuator 304 adjusts the sensitivity of the sensor 115, while the second control actuator 306 controls an on time of the outdoor light. Accordingly, the embodiments of FIGS. 1 and 2 provide a simple user interface which significantly improves the functionality of outdoor lights having a motion detection features, and enables a user to control the functionality of the of the motion detector from a user interface which is located remote from the light, such as indoors.

According to other embodiments, the mode actuator and the control actuators may be implemented in a user interface 401 enabling timer functions, wherein timer characterization data having sensor settings are downloaded to the switch 110. For example, according to the embodiment of FIG. 4, the user interface 401 comprises a mode actuator 402 which not only enables the off, motion and on modes as set forth above in the description of FIGS. 2-3, but also enable a timer mode. More particularly, when the mode actuator 402 is in a timer position, the outdoor light will be implemented according to timing characteristics which are programmed into the switch 110 or other portion of the outdoor light, such as a control circuit for the outdoor light itself. The user interface 401 comprises a slot 404 for receiving a memory element for having timing characterization data for operating the outdoor light. As will be described in more detail below in reference to FIG. 15, the switch 110 may operate based upon the timing characterization data stored on the memory element inserted into the slot 404, or based upon data transferred from the memory element inserted into the slot to another memory of the switch in response to the actuation of the configuration actuator 406. That is, the configuration actuator 406 enables transferring timing characterization data from the memory element to a memory of the switch 110 by pressing the configuration actuator 406 while the memory element is in the slot 404, for example.

The status indicator 206 provides additional functionality for a switch 110 having timer capability. For example, a red light provided by the status indicator 206 could indicate that the switch does not have data or that it is not operating properly when in the timer mode, an orange light provided by the status indicator could indicate that the switch is receiving timing characterization data from a portable memory device inserted in slot 404, and a green light could indicate that timing characterization data has been successfully downloaded and the portable memory device may be removed.

According to a further embodiment, the status indicator 206 may flash red when the light is not functioning properly in the timer mode, allowing the status light to show red when the light attached to the switch are turned off, and green when the light is turned on. Such an implementation of the actuator would enable the status indicator to not only provide immediate feedback to a user (i.e. enable the user to see the status of the light attached to the switch without going to the light to see the status in the case of an outdoor light), but also enable a user to see if the switch is not providing the correct or desired settings for the light in the timer mode. For example, a user may notice that the status indicator is red at a time when the user believes that the light should be on or when a user would like the light to be on. The user can then reload the timing characterization data to ensure that the data is correct and includes the data that the user desires. Such user feedback can lead to a significant reduction in energy in cases where lights are on longer than necessary.

Figure 4:
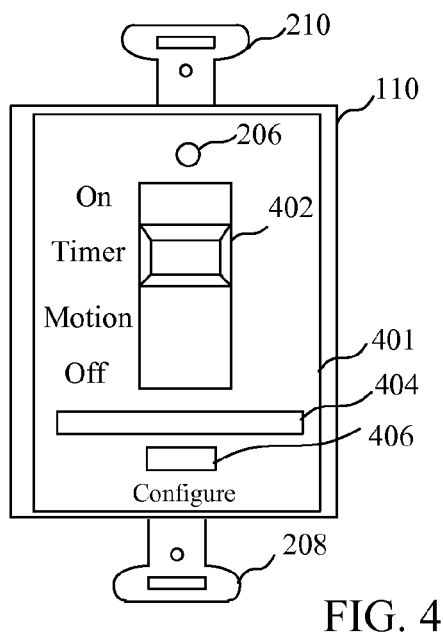
FIG. 4 is a perspective view of a front panel of an indoor portion of a light arrangement comprising a user interface adapted to programmably control a motion detection feature of an outdoor light according to a embodiment of the present invention.

The mode actuator 402 may also be implemented to enable a user to manually override the timing characterization data and turn on or off a light attached to the switch while maintaining the switch in the timer position. Such a feature will prevent a user from inadvertently forgetting to return the switch to the timer position. When the mode actuator 402 is in the timer position, the switch would operate according to timing configuration data stored on or downloaded from a portable memory device and received by way of control actuators on the timer. When the mode actuator 402 is moved to the "off" position, the switch 110 will cause the light to remain off. Conversely, when the mode actuator 402 is moved to the "on" position, the switch will cause a light to remain on. The mode actuator 402 preferably may be pressed inward when in the timer position to override the current setting until the next switching of the light. For example, if a light is set in the on state, the light will be turned off when the mode actuator 402 is pressed and will remain off until the timer is set to turn the light on again. Alternatively, if a light is currently set in the off state, the light will be turned on when the mode actuator 402 is pressed and will remain on until the timer is set to turn the light off again. While the mode actuator 402 provides on example of an actuator for manually controlling a light attached to the timer, it should be understood that other actuators could be employed according to the invention. On benefit of the embodiment of FIG. 4 is that it provides timer capability without the expense of a display and other actuators required to implement the timer. Such a switch having timing capabilities without a display can significantly reduce the cost of the timer.

Figure 5:
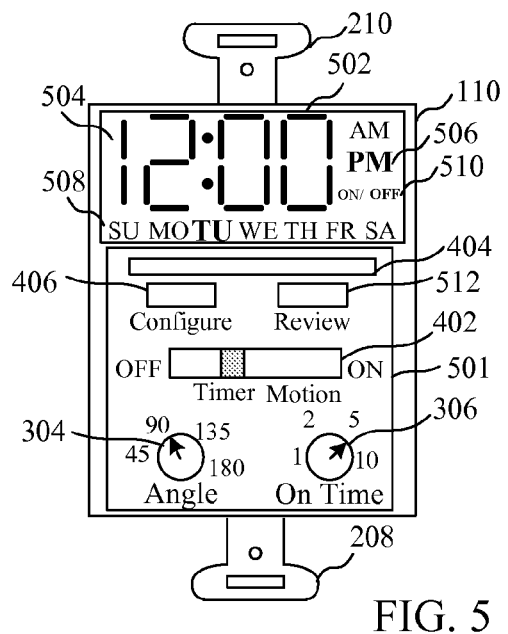
FIG. 5 is a perspective view of a front panel of an indoor portion of a light arrangement comprising a user interface having control actuators control to control a motion detection feature of and adapted to programmably control an outdoor light according to a embodiment of the present invention.

According to the embodiment of FIG. 5, a display 502 provides additional feedback and data, and enables a user to see one or more current settings of timer function and to determine whether the switch is operating properly. More particularly, the display 502 comprises a clock portion 504 which may be set to display "12-hour time" where a separate AM-PM portion 506 would indicate whether the current time was AM or PM (shown here as PM). The display would also preferably include a day-of-the-week portion 508, where the current day of the week is shown here to be Tuesday. The embodiment of FIG. 5 also preferably includes an on/off indicator 510 which will show either "on" or "off" highlighted to indicate a current setting of the timer.

A review actuator 512 may be implemented to enable an evaluation of the timing characterization data. The review actuator may then be pressed, for example, to determine the timing characteristics of the switch. That is, when the review actuator is pressed, the entire timing characterization will be shown on the display. For example, the day starting with Sunday would be indicated on the display with the on and off times being indicated in sequence with a corresponding time for each on and off setting by the on/off indicator 510. According to alternate embodiments, depressing the review actuator will cause the timing characterization of the current day to be displayed, where depressing of the review actuator again would cause the timing characterization data for the following day to be displayed. According to the alternate embodiment, depressing and holding the review actuator for a predetermined period of time would cause the entire timing characterization data from Sunday to Saturday to be displayed. While an angle setting or on time value may be loaded into the switch with the timing characterization data as will be described in more detail below, the embodiment of FIG. 5 may instead include the control actuators 304 and 306 to set the angle setting and on time value. While various features are shown in different embodiments, the different features may be interchanged in the different embodiments as desired.

Turning now to FIGS. 6-9, various embodiments of a switch 110 including an ambient light sensor mode are shown. When using an outdoor light with an ambient light sensor, a user may want to turn on a light before the ambient light sensor detects that it is dark enough to turn on the light or after the ambient light sensor detects a low light condition associated with dusk. For example, while a light sensor may detect dusk at an appropriate time to turn on an outdoor light for a user, there may be occasions when a user may want to turn on the outdoor light before the light sensor would otherwise turn on the light. For example, a user may be entertaining outside, and would like to turn one or more outdoor lights before the light sensor would normally turn on the light.

Figure 6:
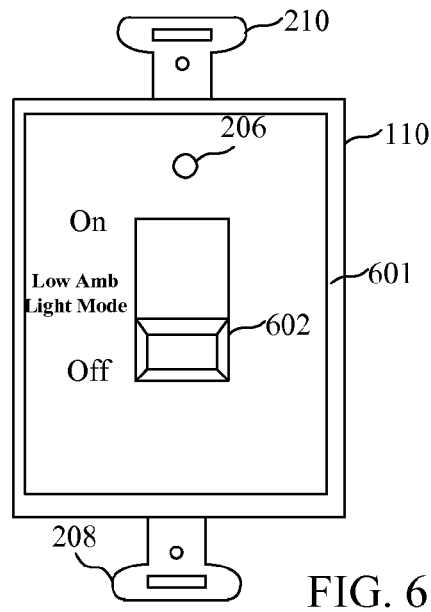
FIG. 6 is a perspective view of a front panel of an indoor portion of a light arrangement comprising a user interface adapted to control an ambient light feature of an outdoor light according to a embodiment of the present invention.

As shown in FIG. 6, a user interface adapted to control a light sensor feature is shown. In particular, the switch 110 comprises a user interface 601 having a mode actuator 602. The mode actuator 602 is movable between an off position (for blocking power to the outdoor light), a sensor position (i.e. a low ambient light position for enabling the outdoor light to operate in response to the sensor 115 comprising an ambient light detector), and an on position. In the on position, the mode actuator 402 enables overriding an ambient light detector to turn the light on. That is, rather than just applying power to the outdoor light so that the light will be responsive to the ambient light detector, one or more control circuits associated with the outdoor light arrangement enables the light to be turned on rather than only turned on in response to the ambient light detector. As will be described in more detail below, the light will be controlled in response to a signal generated at the user interface to enable the light to be turned on regardless of the status of the ambient light detector.

For example, rather than operating from the outdoor light from dusk-to-dawn, the circuits and methods of the present invention enable the operation of the light to not turn on until after a predetermined amount of time after a low ambient light condition is detected, to operate for a predetermined number of hours (e.g. 2, 4, 6 or 8 hours after initially detecting a low ambient light condition), or to turn off a predetermined amount of time before the detection of a low ambient light condition associated with dawn. According to one aspect of the invention, the controls enable adjusting settings for the ambient light sensor from inside at a user interface associated with the switch 110.

Figure 7:
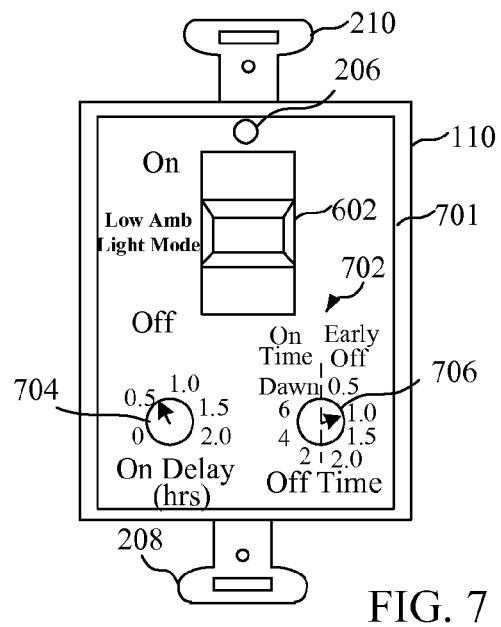
FIG. 7 is a perspective view of a front panel of an indoor portion of a light arrangement comprising a user interface having control actuators adapted to control an ambient light feature of an outdoor light according to a embodiment of the present invention.

A user interface having control actuators adapted to control a light sensor feature of an outdoor light is shown in FIG. 7. In addition to the mode actuator 602 (which is shown in the low ambient light mode for enabling the light to operate in response to the ambient light detector), a first control actuator 704 and a second control actuator 706 are provided. The first control actuator 704 comprises an actuator for setting a delay period for turning the light on. That is, the first control actuator 704 sets an on time for the light after the ambient light detector detects a low enough level of light to be considered dusk. For example, the first control actuator 704 is movable between five settings, shown in FIG. 3 as 0 hours, 0.5 hours, 1.0 hours, 1.5 hours, and 2.0 hours, where the delay setting represent the amount of time after dusk is detected that the light is turned on. As should be apparent, the embodiment of FIGS. 6-9 also adjust the sensitivity of the sensor and the on time of the light, where the first control actuator 704 indirectly adjusts the sensitivity of the sensor 115, while the second control actuator 706 controls an on time of the outdoor light.

Because the ambient light detector must not be set at such a minimal level of light that would cause the light to remain off on a moonlit night, a light using an ambient light detector may turn on earlier than desired at an ambient light detector trigger level. For example, a light responsive to an ambient light detector may turn on when the sun is just beginning to set (i.e. at an ambient light level which is greater than a moonlit night during a full moon for example). For many user, the light may be turning on too early. In a case where the outdoor lights are being used for aesthetic purposes, the use of such an ambient light detector may detract from the overall appearance of the lighting when the lights are turned on early. Further, operating the outdoor lights for a greater period of time than is necessary results in wasted energy. Accordingly, controlling the on time of the light after the detection of a low level of light is beneficial to the user.

Similarly, it may be beneficial to turn off the light before an ambient light level representing dawn is detected. For example, in the case of aesthetic lighting, a user may only desire that the outdoor lighting be on for a certain period of time during the evening (e.g. a certain number of hours), but may not wish to be constantly adjusting the on time for the light based upon specific timer settings which would have to be adjusted with the change of seasons. In the case of security lighting, the user may desire that the lights are on for a greater period of time, but may not be particularly concerned about keeping the lights on as dusk approaches. As in the case of turning a light on using an ambient light detector, turning the light off would require that the ambient light level to rise to a certain level, such as the ambient light detector trigger level, after the sun starts to rise.

Accordingly, a control actuator 706 enables turning off the light at some selected time other than when a minimum amount of light is detected by the ambient light sensor to turn the light off. As shown in FIG. 7, the control actuator 706 enables selecting an off-time setting. The off-time setting may be a period of time that the light is on, or an early off period representing the amount of time before the ambient light detector trigger level is estimated to the detected. As also shown in FIG. 7, the control actuator 706 is movable to either a fixed number of hours that the light is on after it has been turned on. For example, the settings on the left side of the dashed line through the control actuator 706 represent the number of hours (e.g. 2, 4 or 6 hours as well as a dawn setting) that the light is on (i.e. an on-time setting) after it is turned on.

The settings on the right side of the dashed line through the control actuator 706 represents an early off-time setting with respect to the detection of a minimal ambient light condition, such as an ambient light condition representing dawn. As shown in FIG. 7, the light could be set to turn off a predetermined number of hours (e.g. 0.5, 1.0, 1.5, or 2.0 hours) before dawn is detected. That is, the light could be turned off based upon the detection of the actual time when the ambient light detector detected dawn on a different day, such as the previous day. More particularly, a time when the ambient light detector detects a predetermined ambient light level could be recorded and stored in memory each day or at some other predetermined interval. Accordingly, the time when the light should be turned off on a given day could be based upon the setting of the early-off time and a current time setting. For example, if the control actuator 706 is set to an early-off time of 1.0 hours, the light would be turned off, based upon a current time of a clock of the switch, 1.0 hours before the time that the predetermined ambient light level associated with dawn was detected on the previous day. As should be apparent, the delays in turning the light on after a predetermined light condition which would be consistent with dusk and the ability to set an off time (other than the detection of a low ambient light condition which would be consistent with dawn) enables users to not only set the on and off times of a light controlled by an ambient light detector to more suitable times for their individual needs, but also enable a user to conserve energy by not having the lights on at times when the lights are really not needed.

Figure 8:
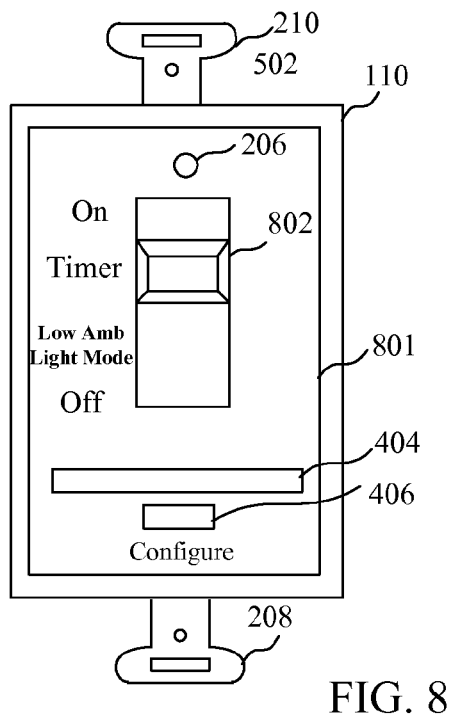
FIG. 8 is a perspective view of a front panel of an indoor portion of a light arrangement comprising a user interface adapted to programmably control an ambient light feature of an outdoor light according to a embodiment of the present invention.
Figure 9:
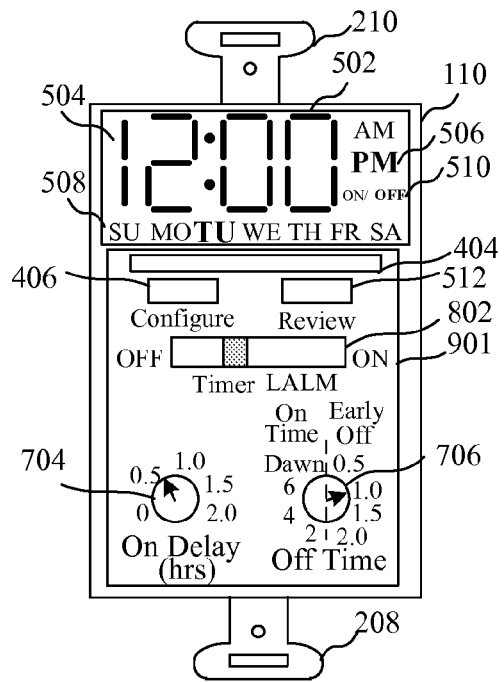
FIG. 9 is a perspective view of a front panel of an indoor portion of a light arrangement comprising a user interface having control actuators to control an ambient light feature of and adapted to programmably control an outdoor light according to a embodiment of the present invention.

As shown in the embodiment of FIG. 8, a mode actuator 802 also enables the selection of a timer mode. That is, a user may select a timer mode which will cause the light to operate according to timing characterization data provided to the switch 110 by way of a memory element inserted in the slot 404, as described above in reference to FIG. 4. As will be described in more detail below, the settings for turning on the light when the mode actuator is in the low ambient light mode may be provided with the data downloaded to the switch 110 when programming the timing characterization data. Alternatively, the control actuators 706 and 706 may be provided on the user interface 801. As shown in FIG. 9, the embodiment of FIG. 8 could be implemented with a display as shown and described in reference to FIG. 5, and a user interface 901 having the control actuators 704 and 706 as shown.

One benefit of the embodiments having control actuators for either a motion detector or an ambient light detector is that the needs of the light as well as the desired uses of the light may vary over the period of the year. The ability of a user to adjust the various settings of the light, such as the settings of the motion detector or the ambient light detector, from a user interface associated with the switch 110 enables the user to conveniently make adjustments. Because these adjustments may take a number of days in order to achieve the desired results, the ability to access the settings using control actuators on the user interface provides a significant benefit to a user. However, as will be described in more detail below, settings controlled by control actuators could also be set by using a program for storing data and downloading the data to a memory of a switch or some other memory associated with the light.

Figure 10:
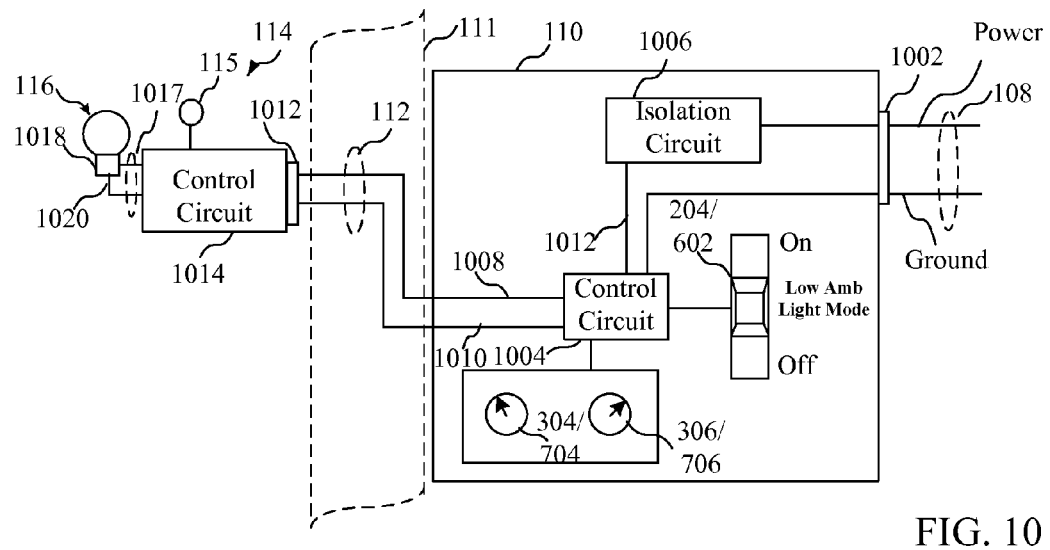
FIG. 10 is a block diagram of a light arrangement having an outdoor light and corresponding sensor and control circuit and having a user interface accessible by a user from inside a building implementing the light arrangement according to an embodiment of the present invention.

Turning now to FIG. 10, a block diagram of a light arrangement having an outdoor light (with a corresponding sensor and control circuit) and a user interface accessible by a user from inside a building implementing the light is shown. Power and ground signals are coupled to an input terminal 1002. The power is received by a control circuit 1004 by way of an isolation circuit 1006. The isolation circuit 1006 conditions the input power signal by doing any necessary voltage conversion and filtering of noise. The isolation circuit 1006 also enables the application of a low voltage DC signal to the control circuit 1014 and the sensor 115 to enable communication of control signals between the outdoor light 114 and the switch 110. As will be described in more detail below, the isolation circuit may also be used as a filter any data transmitted from the control circuit 1014 to the outdoor light 114. A power line 1008 for routing a power signal to the light and a ground line 1010 for routing a ground signal to the light are coupled to the light 114 by way of wiring element 112. As will be described in more detail, the power signal 1008 may comprise a modulated power signal or have a DC component which is provided on the power line. More particularly, the control circuit 1004 receives a mode signal from the mode actuator 204/602 and control signals from control actuators 304 and 306. While the particular circuits showing the generation of communication signals show routing communication signals on the power line by way of example, it should be understood that data could be communicated on the ground line rather than power line.

Further, while the switch 110 is shown having two power wires going into the switch and two power wires coming out of the switch, it should be understood that the switch could have a single wire going into the switch and a single wire coming out of the switch, as in a conventional switch where the switch is spliced in the power line. For example, if the power line is used for providing data signals from the user interface to the light, the ground line of the electrical wiring 108 could be routed directly to the light 114. That is, the switch 110 would be a two-terminal device receiving the power line at one input and providing a power line to the light 114. Accordingly, the connector 1012 of the light would receive a power signal from the switch 110 and a ground line from the electrical wiring of the building having the light. However, the ground may be coupled to the switch, or a neutral signal may be provided to provided reference voltage for operating the control circuit 1014 and sensor 115. A control circuit 1014 receives power and any control signals by way of connector 1012 as well as a sensor status signal from the sensor 115. The control circuit 1014 is electrically coupled to the light 116 by way of electrical wiring 1017 at a positive terminal 1018 and a negative terminal 1020 of the light.

The control circuit 1004 of the switch 110 and the control circuit 1014 of the outdoor light 114 work in coordination to enable the operation of the outdoor light according to the features described in reference to FIGS. 2-9. As will be described in more detail below in reference to the embodiments of FIGS. 11-12 and FIGS. 13-14, the control of the application of power to the light may reside either in the switch 110 in response to a sensor status signal provided from the outdoor light to the control circuit 1004 and in response to settings of the mode actuator 204 and control actuators 304 and 306, or may reside in the control circuit 1014 based upon signals received from the control circuit 1004 and the sensor 115.

Figure 11:
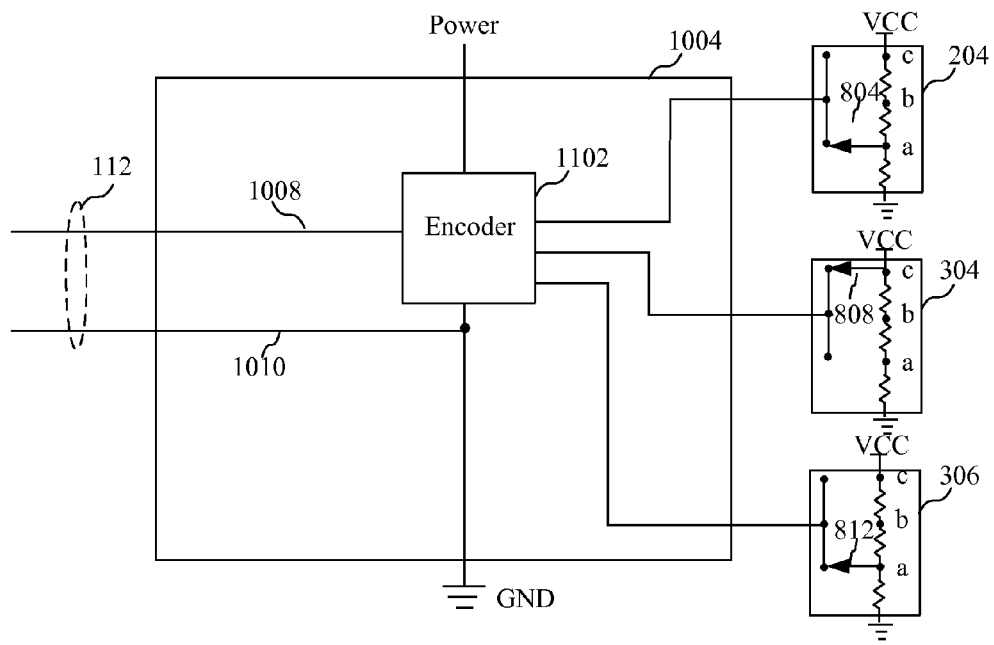
FIG. 11 is a block diagram of a control circuit and mode and control actuators according to an embodiment of the present invention.
Figure 12:
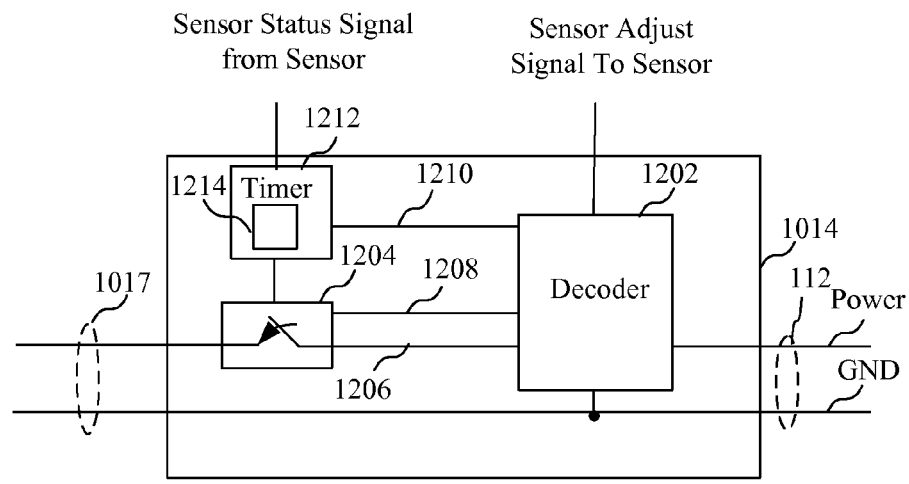
FIG. 12 is a block diagram of a control circuit associated with an outdoor light of a light arrangement according to an embodiment of the present invention.

Turning first to the embodiment of FIGS. 11 and 12, a block diagram of a control circuits are shown. According to the embodiment of FIGS. 11 and 12, mode and control signals generated by an encoder 1102 are provided to the control circuit 1014 of the outdoor light, where the control circuit 1014 then regulates the application of power to the outdoor light as will be described in more detail in reference to FIG. 12. More particularly, control circuit 1004 is coupled to receive the power signal, which could be for example a 60 hertz, 120 volt alternating current power signal. The output of the mode actuator 204 is coupled to the control circuit 1004 so that the correct encoded control signal is provided to the control circuit 1014. That is, the control circuit 1004 will generate a different mode control signals in response to the state of the mode actuator. As shown in FIG. 11, the mode control actuator is a switch having a movable contact 1106 which may be moved to different locations, shown here as locations a, b and c, of a resistor divider network. Similarly, the control actuators 304 and 306 have movable contacts 1108 and 1110, respectively, for selecting different outputs of a resistor divider network. The outputs of the control actuators based upon the location of the movable contacts 1108 and 1110 generate control signals which are coupled to the encoder 1102.

Figure 17:
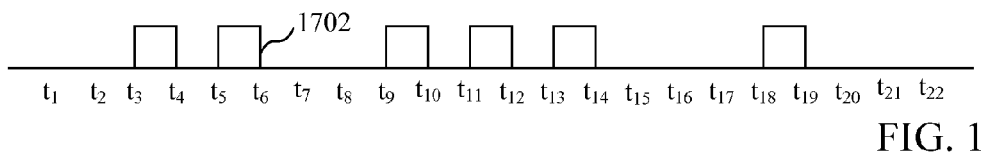
FIG. 17 is a data stream comprising DC signals sent on AC power lines for providing power to an outdoor light according to an embodiment of the present invention.

According to the embodiment of FIG. 11, when the movable contact 1106 is in location a (representing the off state), the input to the switch 1104 is a low voltage is applied to the encoder 1102. While the power signal is not applied to the light when the mode actuator 204 is in the off position, a low voltage signal is provided to the control circuit 1014 of the outdoor light to enable the control circuit and the sensor 115 to operate. As will be described in reference to FIG. 17, the DC signal may be modulated at a high frequency to enable powering the control circuit 1014 while providing the control signals. When the movable contact is moved to either location b or c, a voltage generated by the resistor divider network enables power applied to the encoder 1102 to be coupled to the outdoor light 114.

Even in the off mode, the encoder 1102 will apply a low voltage DC power, such as a 5 volt signal, to the outdoor light to enable the control circuit 1014 and the sensor 115 to operate, and more particularly provide control signals which may be used by the control circuit 1004 of the switch even when power is not provided to turn on the light. In either the sensor mode or the on mode, the encoder will provide a mode control signal to the control circuit 1014 of the outdoor light to enable the outdoor light to operate in an on mode or a sensor mode (e.g. motion detection mode or low ambient light mode). That is, in addition to providing power to enable the light to operate, the control circuit 1004 will provide control signals to the control circuit 1014 which will enable the light to function in the sensor mode or the on mode. Exemplary embodiments for generating an encoded signal on the power line 1008 will be described in FIGS. 16-22.

As shown in FIG. 12, power is provided to the outdoor light 114 on the power line 1008. Based upon a control signal also provided on the power line, a decoder 1202 will control the application of power to the outdoor light. The decoder 1202 is coupled to control a switch 1204 coupled to a power line 1206 for providing the power to the light by way of the switch 1204. More particularly, a signal from the decoder 1202 on a control line 1208 will control the switch to operate in an on mode. That is, if the decoder 1202 determines that a control signal received by the outdoor light indicates that the outdoor light is in the on mode, the control signal on the control line 1208 will enable power to be applied to the light until the mode actuator 204 is moved to another position other than the on position.

However, if the decoder 1202 determines that a control signal received by the outdoor light indicates that the outdoor light is in a sensor mode such as a motion detection mode or low ambient light detection mode, the decoder 1202 provides a signal by way of a control line 1210 to a timer circuit 1212. When the mode actuator 204 is in a sensor mode, the decoder 1202 will not provide a signal to close the switch 1204 to continuously provide power to the outdoor light, but rather will apply a signal to the timer circuit 1212. That is, the timer circuit 1212, in response to a sensor status signal from the sensor and one or more control signals on control line 1210 from the control circuit 1004 of the switch, will control the switch 1204. The decoder 1202 will also provide a sensor adjust signal to the sensor. For example, in an outdoor light having a motion detector, the sensor adjust signal could be used control the angle of operation of the motion detector or the on time of the light as set forth above.

As will become apparent in reference to the operation of the different types of lights, including an outdoor light having a motion detector or an outdoor light having an ambient light detector, the timer will control the application of power to the light. For example, when the circuit of FIG. 12 is implementing an outdoor light having a motion detector, the timer will be configured to provide light for a predetermined period of time after motion is detected. Alternatively, when the circuit of FIG. 12 is implementing an outdoor light having an ambient light detector, the timer will be configured to provide light for a predetermined period of time based upon settings to delay the time when the light is turned on and/or a setting for turning the outdoor light off before dawn. When implementing an outdoor light having an ambient light sensor, the timer circuit 1212 may have two timers to implement the different functions of the control actuators 704 and 706. The timer circuit 1212 may also comprises a memory 1214 for storing a detected time for a condition (e.g. a low ambient light level) detected by the sensor. As will be described in more detail below, the detected time stored on a given day may be used as an estimated time for the condition on a subsequent day.

Figure 13:
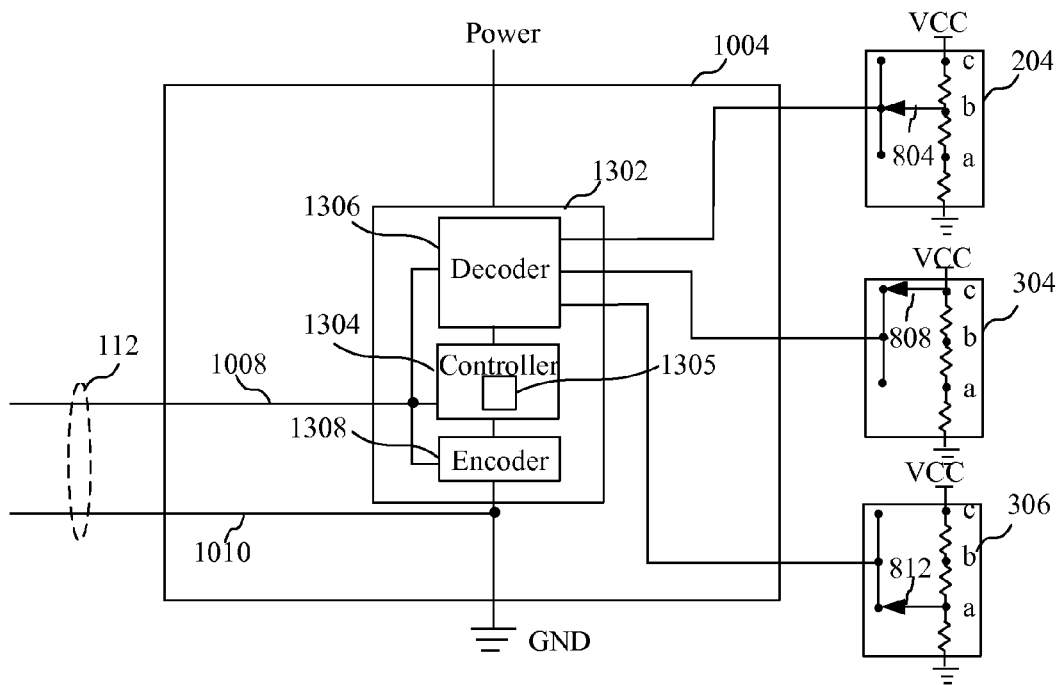
FIG. 13 is a block diagram of a control circuit and mode and control actuators according to an alternate embodiment of the present invention.
Figure 14:
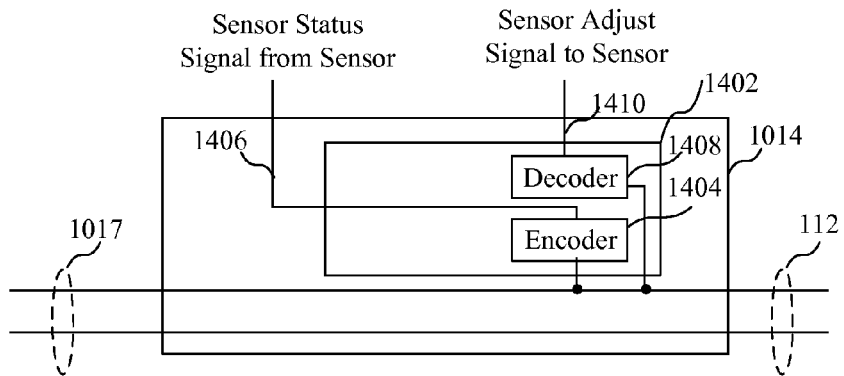
FIG. 14 is a block diagram of a control circuit associated with an outdoor light of a light arrangement according to an alternate embodiment of the present invention.

Turning now to the embodiment of FIGS. 13 and 14, an alternate embodiment of controlling the outdoor light is shown. According to the embodiment of FIGS. 13 and 14, control circuit 1004 will more directly control the application of power to the outdoor light in response to one or more control signals, such as a sensor status signal, received from the control circuit 1014 of the outdoor light. In particular, a coder/decoder (codec) circuit 1302 comprises a control circuit 1304 having a memory 1305 and which is coupled to control a decoder 1306 and an encoder 1308. The decoder 1306 is not only used to decode the input signals from the mode actuator 204 and the control actuators 304 and 306 of the user interface 110, but also to decode control signals received from the outdoor light 114 on the power line 1008. The memory 1305 may be used for storing a detected time for a condition detected by the sensor, as will be described in more detail below.

As shown in FIG. 14, a codec 1402 comprises an encoder 1404 coupled to receive input signals from the sensor on a line 1406. The encoder can then provide an encoded control signal, such as a sensor status signal, from the light 114 to the control circuit 1004 of the switch 110. A decoder 1408 is also coupled to the power line 1008 to decode control signals for controlling the sensor, such as a sensor adjust signal which is used for setting a detection angle of a motion detector. Accordingly, any required timing functions could be implemented by the controller 1304 of the control circuit 1302. That is, rather than a signal being generated within the control circuit 1014 based upon a timer of the control circuit 1014 to control the on-off state of the light, the state of the sensor is provided to the control circuit 1004, which will then control the application of the AC power signal to the light to control the on-off state of the light. While the embodiments of FIGS. 11-12 and 13-14 provide the same operational control of the light, the different arrangements may be selected to implement a more efficient allocation of resources for the user interface 110 and the light 114. However, it should be understood that other circuit arrangements for enabling control of the light based upon input from the mode actuator and control actuators could be employed.

Figure 15:
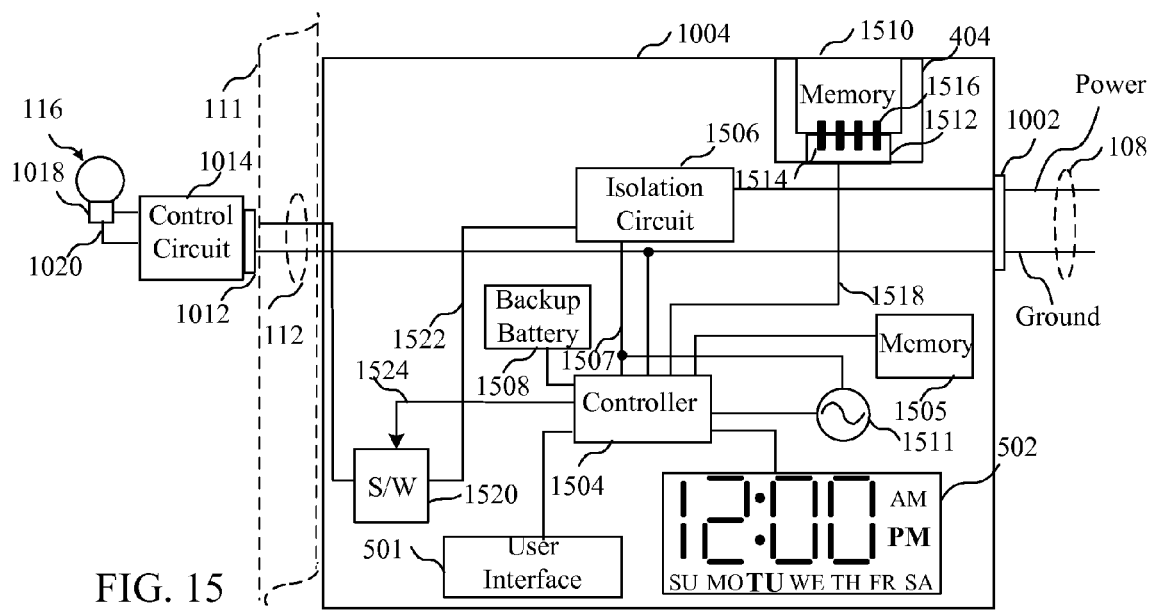
FIG. 15 is a block diagram of a control circuit enabling the programmable implementation of a light having an outdoor sensor according to an embodiment of the present invention.

Turning now to FIG. 15, a block diagram of a control circuit enabling the programmable implementation of an outdoor light having a sensor according to an embodiment of the present invention is shown. According to the embodiment of FIG. 15, the controller 1504 is coupled to an isolation circuit 1506. The controller 1504 may be a processor, such as a microprocessor for example. The power signal may be coupled to the isolation circuit 1506 which generates a reference voltage on an internal voltage line 1507. The voltage generated on the internal voltage line 1507 may comprise a low voltage (e.g. 5 volts for powering circuit elements of the user interface) which may be coupled to the other elements by the controller 1504. A backup battery 1508 is also coupled to the controller 1504, and may be charged by the voltage applied to the control circuit and used by the control circuit to power other elements of the control circuit 1004 in the event of a loss of power. The controller is also coupled to the user interface 501 to receive inputs entered by a user, as well as the display 502 to display the status of the switch as set forth above. The controller 1504 is also coupled to an oscillator 1511 which enables the controller to maintain the time for the switch after a current time is supplied to the switch.

Also shown in FIG. 15 is the slot 404 for receiving a portable memory device 1510. The slot comprises a connector 1512 having contact elements 1514 for mating with corresponding contact elements 1516 of the portable memory device 1510. The slot 404 may have a depth which is just slightly less than the length of the portable memory device so that the portable memory device extends slightly outside of the switch. The slot may also comprise a spring loaded slot enabling a user to depress the portable memory device, resulting in the portable memory device extending further outside the slot so that it can easily be removed from the slot. The controller 1504 accesses the portable memory device by way of a communication link 1518, which may be a bidirectional data bus. The portable memory device could be any type of non-volatile memory device. By way of example, the portable memory device could be, but not limited to, a secure digital (SD) card, a Sony brand "memory stick", or portable USB memory device. According to one embodiment, the connector 1512 could be a connector for receiving a portable universal serial bus (USB) memory device. The slot may be configured to receive the portable memory device, where the portable memory device may reside within the slot during normal operation, or have a connector substantially at the surface of the switch, where the portable memory device is generally coupled to the connector of the slot during configuration of the switch or when otherwise necessary and then removed.

The switch 110 also comprises a power control switch 1520 which enables the application of a power signal provided by a power line 1522 from the isolation circuit 1506 to the outdoor light. The power on the power line 1522 is the appropriate signal for providing power at the outdoor light. The switch is controlled by a control signal 1524. The switch 1520 functions to decouple power from the outdoor light according to input from the user interface and the state of a sensor attached to the user interface, as described above in reference to FIGS. 11-14. As will be described in more detail below, the control signal 1524 coupled to control the switch 1520 may generated by the controller 1504 according to timing characterization data stored in the portable memory device 1510. The controller 1504 will also enable the current time and date to be displayed, as well as enable other functions such as the review function to review the timing characterization data in response to the selection of the review actuator 512 of the user interface 501, for example. Additional details related to operation of an advanced switch having timer capability may be found in U.S. application Ser. No. 12/846,971, entitled USER INTERFACE FOR AND METHOD OF IMPLEMENTING A USER INTERFACE IN A CONFIGURABLE LIGHT TIMER, filed on Jul. 30, 2010 by the Applicant of the present invention, the entire application of which is incorporated herein by reference.

While the timing characterization data on the portable memory device for operating the switch may be accessed by the controller 1504, the data on the portable memory device may be loaded into a memory 1505 by the controller 1504. The memory 1505 may be a fixed, internal memory, for example. Alternatively, the data on the portable memory device may be stored in a memory cache of the processor, thereby reducing the cost of the switch. Rather than accessing the timing characterization data from the portable memory device, the control circuit would access the timing characterization data from the memory 1505 or a cache memory of the processor after the timing characterization data is downloaded and the portable memory device is removed. For example, the controller 1504 would provide the necessary read and write access signals to read data from and write data to the memory 1505 by way of a data access bus between the controller and the memory. Accordingly, the controller 1504 would access the data from the portable memory device 1510 and enable reading from and providing data to the memory 1505 for later access.

Figure 16:
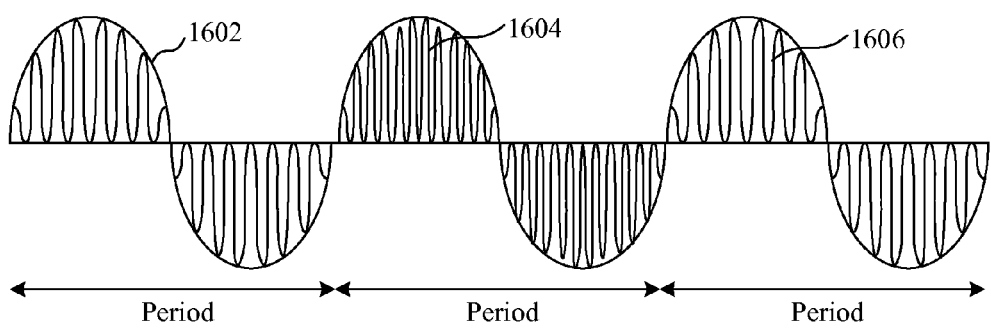
FIG. 16 is a diagram showing the transmission of control signals as a modulated AC signal according to an embodiment of the present invention.

Turning now to FIGS. 16-22, exemplary diagrams show the transmission of encoded control signals between the switch 110 and the outdoor light 114. As shown in FIG. 16, an alternating current (AC) signal comprises an envelope signal 1602 having a modulated waveform. As can be seen, the frequency of the modulated waveform may vary to enable the transmission of data. For example, the envelope power signal 1602 may be a 60 Hertz signal which is used to power the outdoor light, while the data may be transmitted on higher frequency signals having different frequencies, enabling the transmission of control data between the switch 110 and the outdoor light 114. The transmission of data using the alternating current could be implemented according to other data transmission means, such as varying the phase or frequency of the 60 Hertz power signal provided from the switch to the light to transmit the data.

Rather than modulating the AC power signal, it may be possible to send a DC signal at a different frequency on the power line. As shown for example in FIG. 17, various bits 1702, generated by an encoder of the switch or outdoor light, may be transmitted according to a digital data transmission protocol. The data may be low voltage data signals transmitted at a different frequency that the AC signal which is used to power the outdoor light. The DC signal may be filtered and decoded, as is well known in the art.

Figure 18:
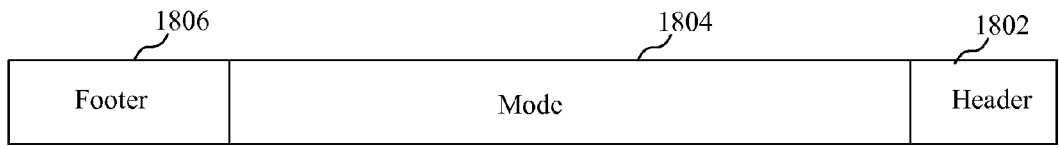
FIG. 18 is a data frame for transmitting mode information according to an embodiment of the present invention.

As shown in FIG. 18, a simple data frame for transmitting a mode control signal is shown. The frame according to the embodiment of FIG. 18 comprises a header 1802 followed by a mode control signal 1804 and a footer 1806. A header in general may be used to provide a start of frame indicator and may include information indicating that the control signal is being sent from a certain element of the outdoor light arrangement (e.g. the switch 110 or the outdoor light 114). The mode control signal will indicate the mode in which the outdoor light should operate. Finally, a footer may be included to provide an end of frame indication.

Figure 19:
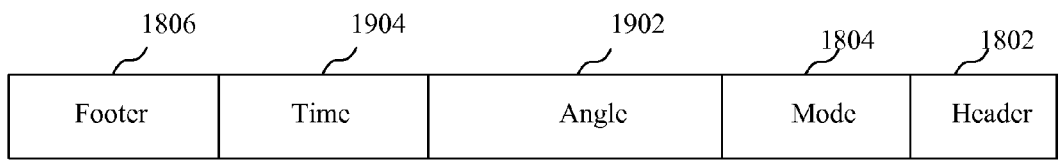
FIG. 19 is a data frame for transmitting mode and control information associated with an outdoor light having a motion detector according to an embodiment of the present invention.
Figure 20:
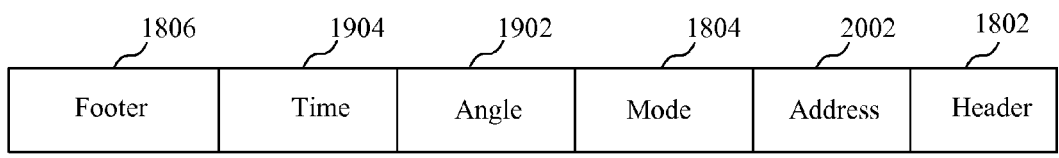
FIG. 20 is a data frame for transmitting mode, control and address information associated with an outdoor light having a motion detector according to an embodiment of the present invention.
Figure 21:
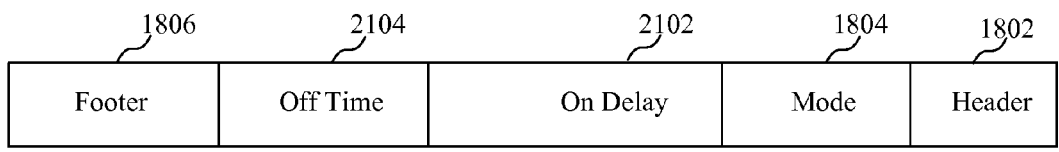
FIG. 21 is a data frame for transmitting mode and control information associated with an outdoor light having an ambient light detector according to an embodiment of the present invention.
Figure 22:
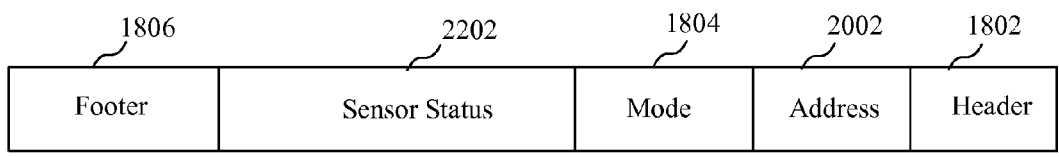
FIG. 22 is a data frame for transmitting a sensor status signal associated with an outdoor light having a sensor according to an embodiment of the present invention.

According to the data frame of FIG. 19, an angle setting 1902 and a time 1904 could be included in the frame to enable the operation of the user interface of FIGS. 2-5. In the embodiment of FIG. 20, an address 2002 may be included to provide a destination address for the frame. Depending upon how the communication is provided on the power lines of the building having the outdoor light arrangement and the use of filtering or blocking circuits, it may be necessary to include a destination address with the frame. Accordingly, only the correct element of the outdoor lighting arrangement will decode an encoded signal. As shown in FIG. 21, an on delay value 2102 and an off time value 2104 could be included to enable an outdoor light arrangement having an ambient light sensor. The frame of FIG. 22 shows an example of a frame having data sent from the outdoor light 114 to the switch 110. According to the frame of FIG. 22, a sensor status signal may be provided. The sensor status signal may indicate that a motion detector has detected the motion of an object, or that a certain ambient light condition has been detected, for example.

While various examples of generating control signals are shown by way of example in FIGS. 11-22, it should be understood that other circuit arrangements and communication protocols, including standard communication protocols for transmitting data on residential electrical wiring, for communicating command signals between a switch 110 and an outdoor light 114 could be implemented.

Figure 23:
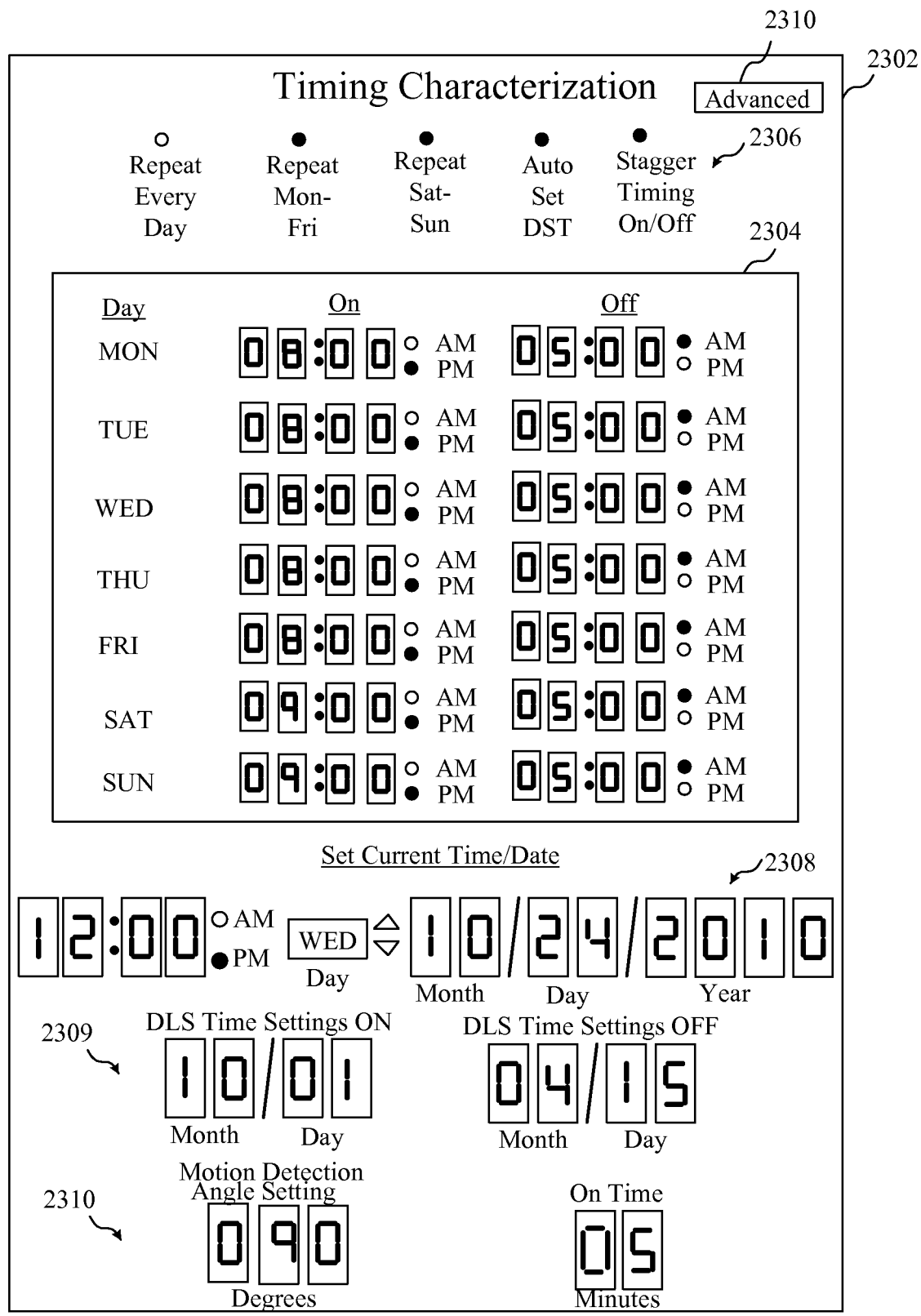
FIG. 23 is a program screen enabling the entry of timing characterization data including motion detection settings by a computer for implementing a light having a motion detector according to an embodiment of the present invention.

Turning now to FIG. 23, a program screen enabling the entry of timing characterization data by a computer for implementing a light timer is shown. The program screens of FIGS. 17-23 are provided on a display of a computer in response to operating a computer program stored on a memory of the computer (or other computer-readable storage medium such as a CR-ROM). Data entered on the various program screens of the computer program are stored on the portable memory device which may then be used by the switch as described above. By way of example, a USB portable memory device may be inserted in a USB port of a computer to enable entering the timing characterization data and any sensor settings, and then removed and inserted into the switch as described above to load the into the switch 110. According to one embodiment, the program for storing the timing characterization data may be stored on the portable memory device, and when the data file on the portable memory device is opened, the program for storing the timing characterization data will be automatically opened. Accordingly, a portable memory device provided with the switch when it is purchased could provide all of the necessary elements to configure and operate the switch.

The timing characterization data may comprise varying amounts of data, but comprises at least one on/off setting for a switch. As will be described in more detail below, the timing characterization data may comprises a plurality of sets of data, including different sets for standard time and daylight savings time. According to some embodiments, the timing characterization data may include a current time and date entered by a user on the computer program. As will be described in more detail below, the current date entered by the user may be used to determine whether to apply a certain set of timing characterization data, such as a set of data for daylight savings time. Because a memory of the switch may comprise a memory having calendar information, such as future dates for daylight savings time, the current date would be used by a control circuit to determine which set of timing data would be used.

According to the embodiment of FIG. 23, a program screen 2302 comprises a main screen which enables the entry of the minimal amount of information necessary to operate the switch. An on/off field 2304 comprises an on time and an off time for each day of the week, where each on time and off time has an AM and PM setting. The numbers may be entered by highlighting the current number for a given time, and entering the desired number on the keypad of the computer, for example.

A customization field 2306 enables customization of the entry program. The customization field will not only ease entry of data in the program screen 2302, but also provide a more desirable performance of the switch. For example, a user may be able to select an option to repeat an entry for every day of the week. If the user selects that option before entering data, the on and off times for Tuesday through Sunday will automatically be entered to match the times entered for Monday. A user could also select an option for repeating Monday-Friday and/or repeating Saturday and Sunday. A user may select an option to enable automatically setting a daylight savings time feature. As will be described in more detail below, the daylight saving time feature could change the time to daylight savings time automatically (based upon a calendar stored in a memory of the switch), and may implement the timer according to daylight saving time characterization data if available. According to a further embodiment, a user may select a staggered on/off timing feature. The staggered on/off timing feature will stagger the times that the light is turned on and off relative to the stored time. The on and off times may be staggered by a varying number of minutes from 1 minute to 15 minutes, for example, and would preferably be performed randomly.

As shown in the embodiment of FIGS. 2-9, no actuators are provided for entering the current time or date. Accordingly, the current time and date must be entered in a field 2308 on the profile screen 2302. The user would preferably set the current time just before the timing characterization data is saved, so that the user could then just insert the portable memory device into the switch to store the timing characterization data. According to one embodiment of the invention, the computer program would prompt a user to enter the current time and date after the user attempts to finalize the data. However, actuators for entering current time and date information could be provided on the user interface.

Figure 24:
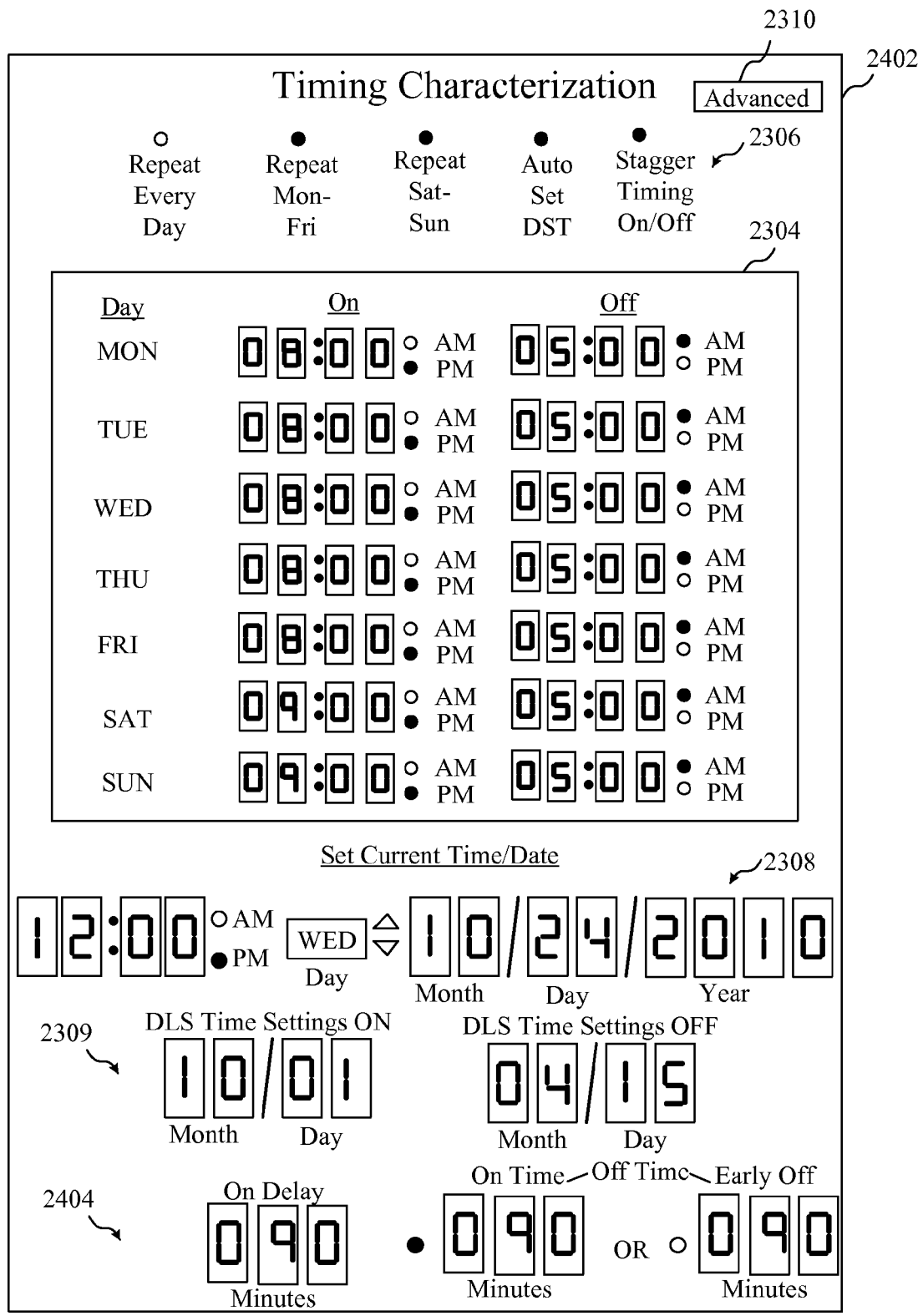
FIG. 24 is a program screen enabling the entry of timing characterization data including ambient light detection settings by a computer for implementing a light having an ambient light feature according to an embodiment of the present invention.

The profile screen 2302 could further include an optional field 2309 enabling a user to manually set dates for applying a certain set of timing characterization data, such as daylight savings timing characterization data. That is, the user could enter a first date indicating the date upon which the daylight savings time timing characterization data should be applied and a second data indicating when daylight savings time should end and the standard time timing characterization data should be applied. By selecting the "Auto Set DST" selection in customization field 2306, daylight savings time timing characterization data will automatically be selected by a control circuit of the switch between the on and off dates entered in the field 2309. Accordingly, if the dates are entered in the field 2309, a daylight savings time actuator would not be necessary on a user interface of the switch. While the dates for applying a set of timing characterization data is shown by way of example for daylight savings time data, dates could be applied for other sets and more than two sets of data. Finally, sensor data could be entered in field 2310. More particularly, a motion detection angle setting or on time could be entered as shown. According to the embodiment of FIG. 24, sensor data for a switch enabling a low ambient light mode could be entered on a profile screen 2402 having a field 2404 for receiving an on delay value and one of two off time values as shown.

Figure 25:
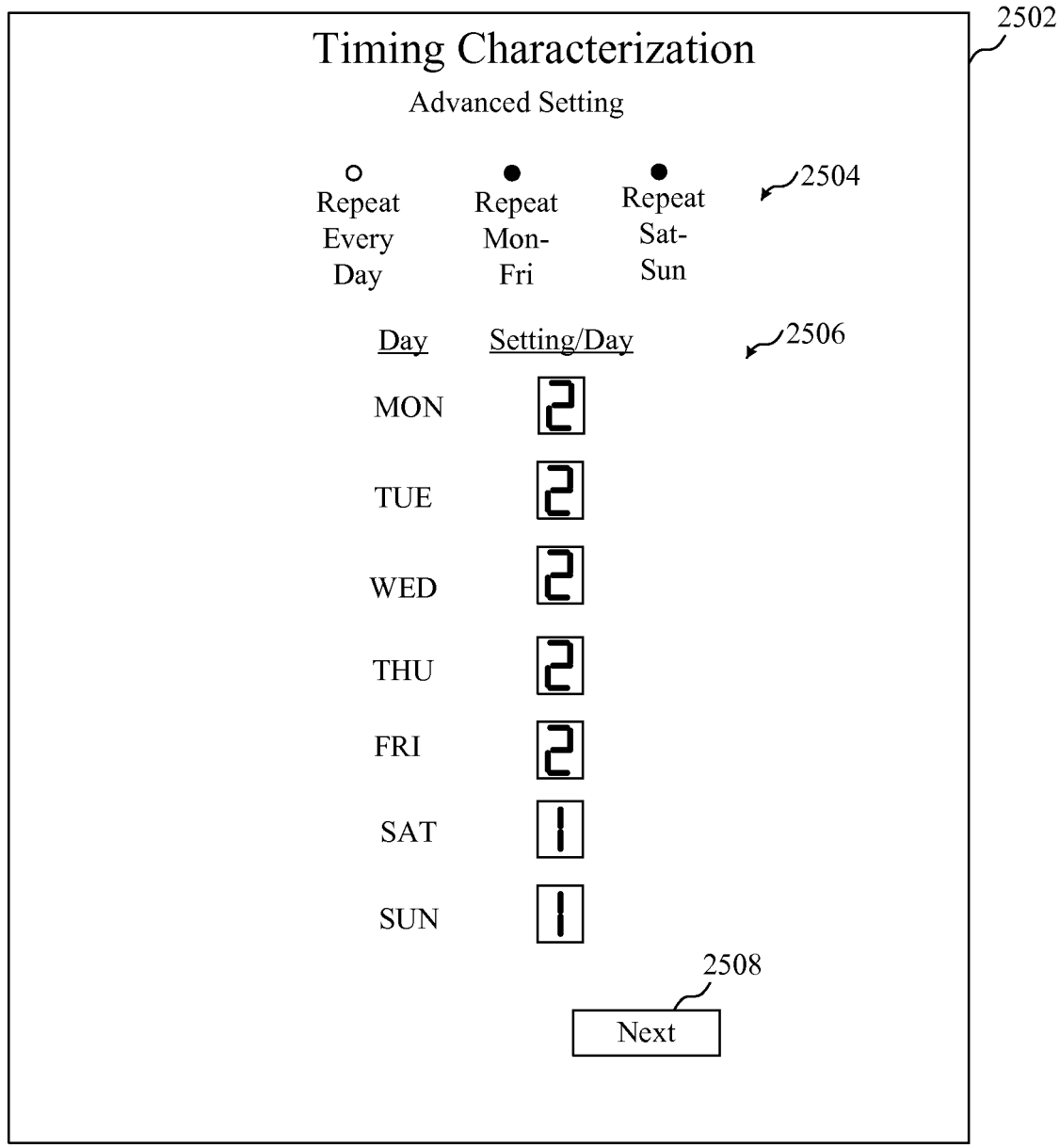
FIG. 25 is a program screen enabling the entry of advanced settings of timing characterization data by a computer for implementing a light timer according to an embodiment of the present invention.

Turning now to FIG. 25, a program screen enabling the entry of advanced settings of timing characterization data by a computer for implementing a light timer is shown. One beneficial feature of a timer is to allow multiple on/off settings for a given day. In particular, a program screen 2502 allows a user to select whether the same number of settings will be provided for each day of the week, Monday-Friday, or Saturday and Sunday in a field 2504. The user would then enter the appropriate data in a field 2506. As in the program field 2302, selecting one of the options in field 2504 would enable a user to reduce the number of settings that would need to be entered. A user would then select a next field 2508.

Figure 26:
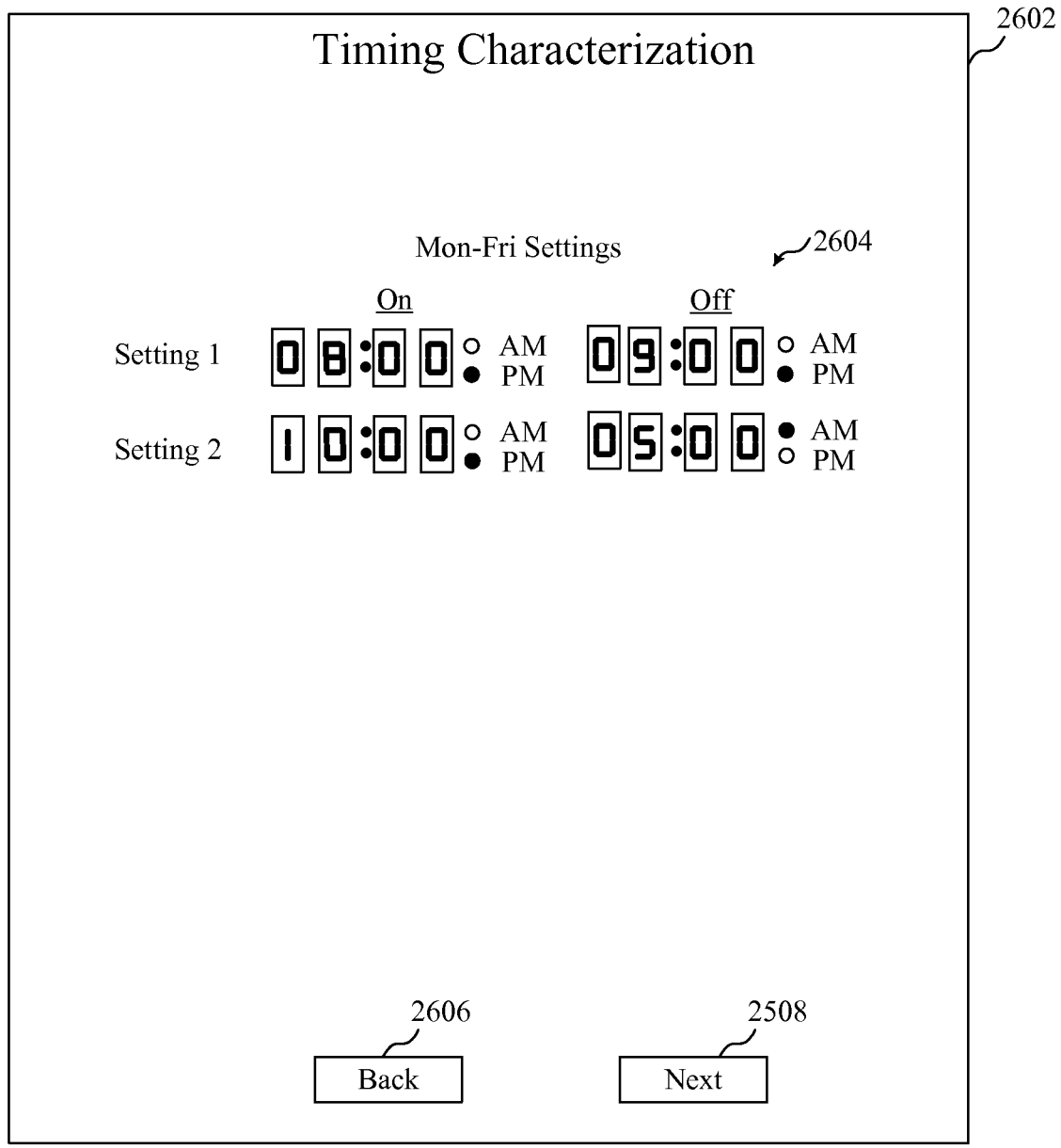
FIG. 26 is a program screen enabling the entry of timing characterization data for a plurality of on/off periods for implementing a light timer according to an embodiment of the present invention.
Figure 27:
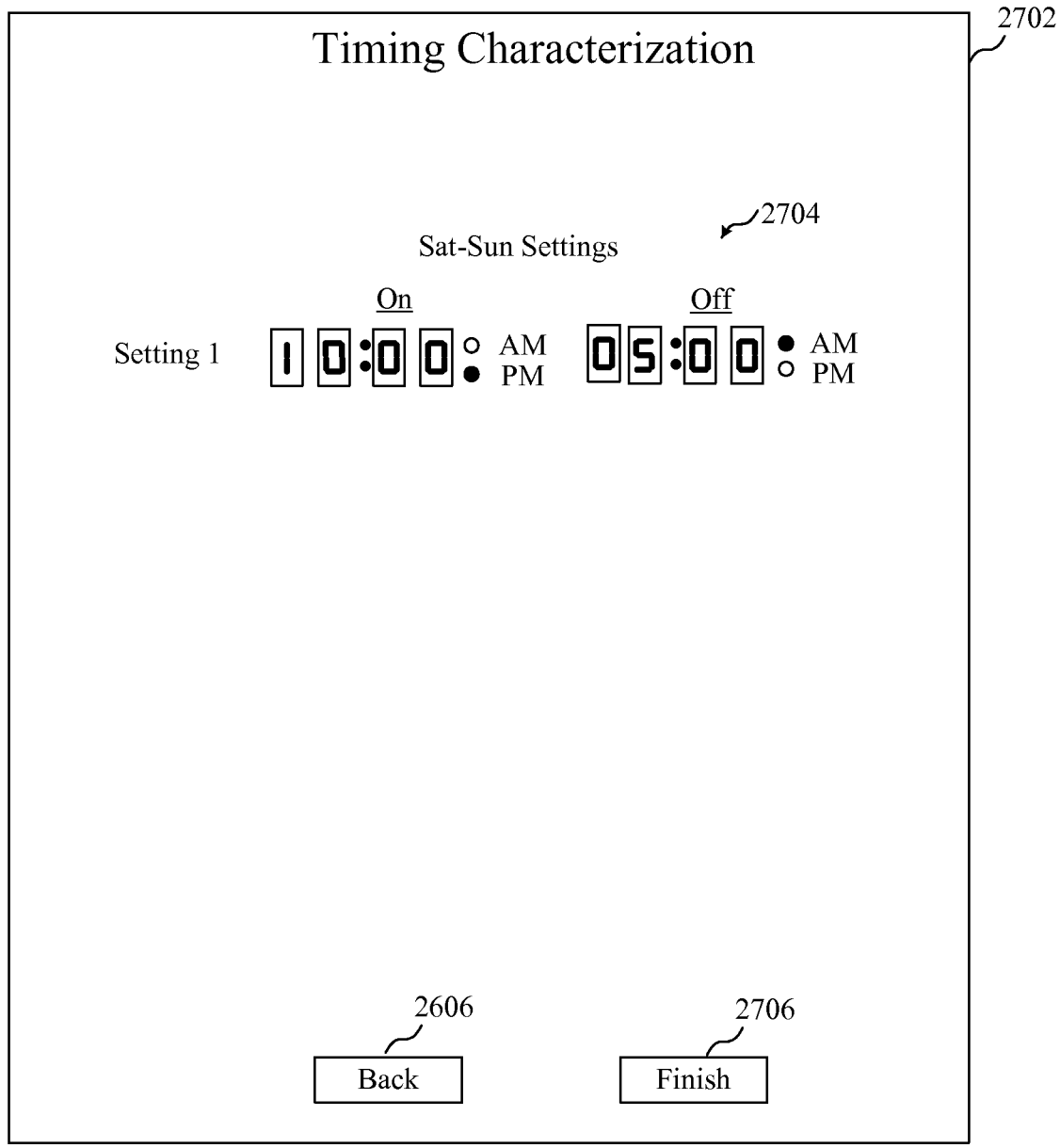
FIG. 27 is a program screen enabling the entry of timing characterization data for a single on/off period for implementing a light timer according to an embodiment of the present invention.

As shown in FIG. 26, a program screen 2602 enables the entry of timing characterization data for a plurality of on/off periods for implementing a light timer during Monday-Friday in a field 2604. Because two settings were entered in the program screen 2508 for Monday-Friday, two settings are provided in the program screen 2602. A user may also go back to a previous screen by selecting the back actuator 2606. Only a single entry is then shown in the program screen 2702, as shown in FIG. 27. After selecting a finish actuator 2706, the user may then use the portable memory device in the switch. As set forth above, the user may be prompted to enter or verify the correct time before finally saving all of the data.

According to another feature of the invention, a user can set data for daylight savings time when setting other characterization data. When daylight saving times data is entered, the daylight savings data will be used during established periods for daylight savings time. For example, according to one embodiment, a daylight savings time data would be applied when a daylight saving time actuator is moved to the on position, indicating that the daylight savings time data should be applied. If dates for applying daylight savings time timing characterization data were entered or calendar dates associated with daylight savings times stored in a memory of the switch, daylight savings time data could only be used during those periods. That is, even if the actuator is set to daylight savings time, the switch would only utilize daylight savings time characterization data when the current date is within an established daylight savings period, as established by on/off dates of daylight savings times or calendar information stored in a memory of the switch. If no daylight savings time actuator is provided on the switch, the switch may automatically apply daylight savings time data whenever the automatic daylight savings time option is selected, such as on the program screen 1702 and the current time is within the established period for daylight savings time.

As shown in FIGS. 29A and 29B, program screens enable the entry multiple settings of timing characterization data when implementing a light timer according to an embodiment of the present invention. Similar to the embodiment of FIG. 21, the embodiment of FIG. 22 enables multiple settings, but the settings may be for different switches. For example, an A setting may be for a switch that is used for the front of the house, a B setting may be used for a switch that is used for the back of the house, a C setting may be used for a switch for an indoor light on a first floor, and a D setting may be used for a switch for an indoor light on a second floor. However, it should be noted that the user could set the A-D settings for any category of timing characterization, such as a vacation setting, a school year setting, a summer setting, etc. By storing multiple settings of timing characterization data, a single portable memory device could be used to load timing characterization data for multiple switches. Further, providing multiple settings on the portable memory device enables a flexible use of a given switch without having to reload timing characterization data. That is, one of the four settings designated as settings A-D could be selected by an actuator on the user interface for the switch 110.

According to one embodiment of the invention, the portable memory device comprises a proprietary memory device. While any memory device may be used, a proprietary memory device may prevent the switch from accessing incorrect data. According to one embodiment, the proprietary memory device comprises a single file which may only be opened on a computer by a program provided by the manufacturer of the switch for storing the data (or by the control circuit of the switch for implementing the data). The name of the data file could not be changed, and only data associated with fields accessible by the user could be entered or changed by the user. Further, the portable memory device may also contain the computer program necessary to enter the timing characterization data. Accordingly, by "double-clicking" on the timing characterization data file, the computer program necessary to enter the timing characterization data will automatically open the timing characterization data file, enabling a user to set or change desired timing characterization data.

Figure 30:
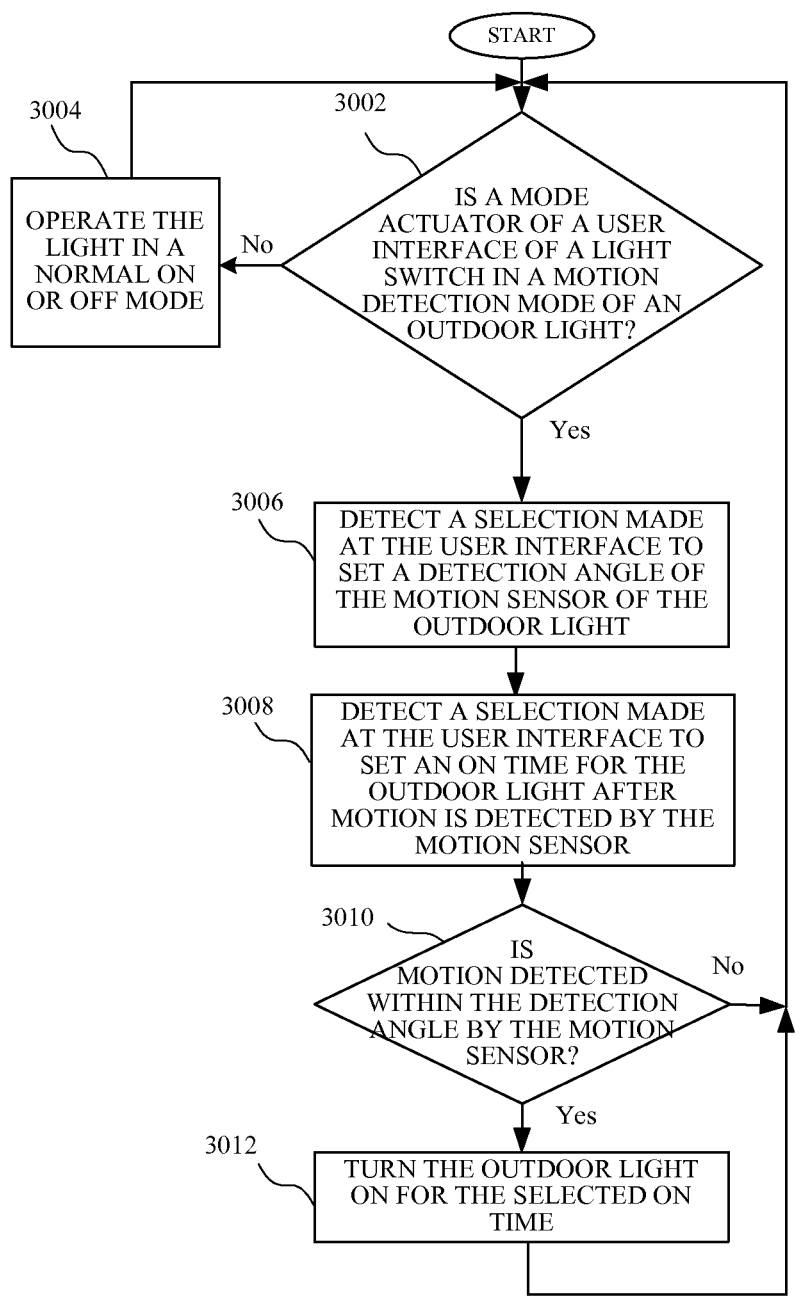
FIG. 30 is a flow chart showing a method of operating an outdoor light having a motion detector according to an embodiment of the present invention.

Turning now to FIGS. 30-35, flow charts show the operation of the switch 110 according to various embodiments. The methods of FIGS. 30-35 may be implemented as described in FIGS. 1-29 as shown and described, or other suitable circuits. While particular steps of the methods are shown, it should be understood that additional steps could be implemented as described in reference to FIGS. 1-29. A flow chart of FIG. 30 shows a method of operating an outdoor light having a motion detector according to an embodiment of the present invention. It is determined whether a mode actuator of a user interface at light switch positioned in a motion detection mode of an outdoor light at a step 3002. If not, the light is operated in a normal on or off mode at a step 3004. If so, a selection made at the user interface to set a detection angle of the motion detector of the outdoor light is detected at a step 3006. A selection made at the user interface to set an on time for the outdoor light after motion is detected by the motion detector at a step 3008. It is then determined whether motion is detected within the detection angle by the motion detector at a step 3010. If so, the outdoor light is turned on for the selected on time at a step 3012. Otherwise, the mode actuator is again monitored at the step 3002.

Figure 31:
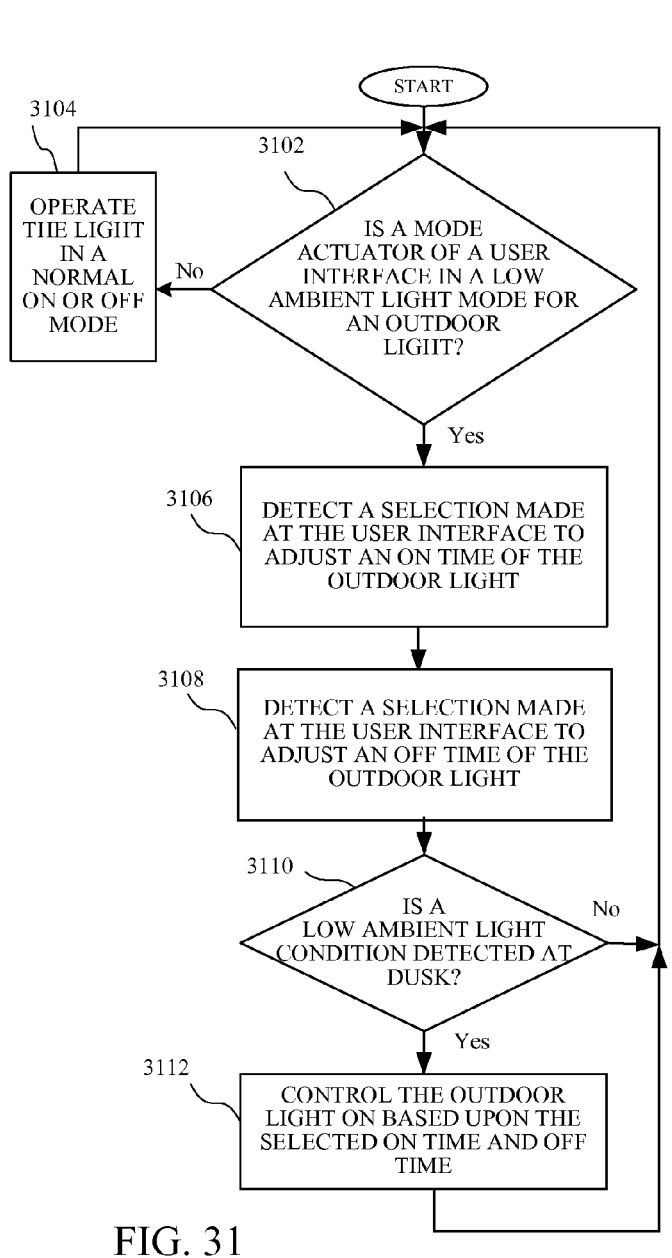
FIG. 31 is a flow chart showing a method of operating a light having an ambient light detector according to an embodiment of the present invention.

Turning now to FIG. 31, a flow chart shows a method of operating a light having an ambient light detector according to an embodiment of the present invention. It is determined whether a mode actuator of a user interface is in a low ambient light mode for an outdoor light at a step 3102. If not, the light is operated in a normal on or off mode at a step 3104. Otherwise, a selection made at the user interface is detected to adjust an on time of the outdoor light at a step 3106. A selection made at the user interface is then detected to adjust an off time of the outdoor light at a step 3108. It is then determined whether a low ambient light condition is detected at dusk at a step 3110. If so, the outdoor light is turned on based upon the selected on time and off time at a step 3112. Otherwise, the mode actuator is again monitored at the step 3102.

Figure 32:
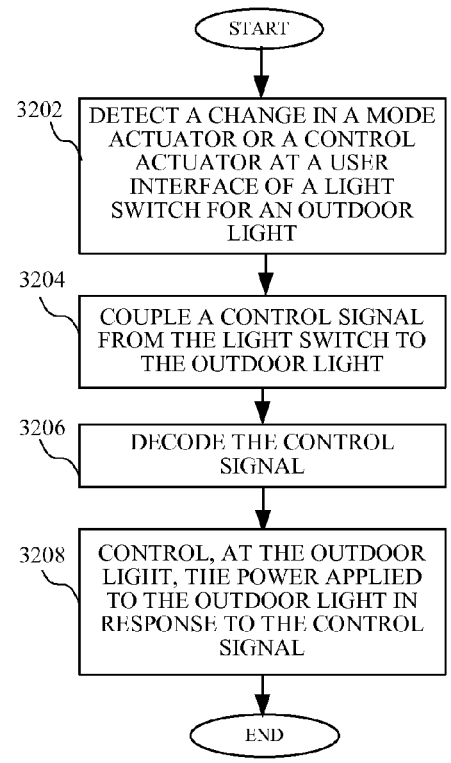
FIG. 32 is a flow chart showing a method of communicating control signals to a control circuit associated with an outdoor light according to an embodiment of the present invention.

Turning now to FIG. 32, a flow chart shows a method of communicating control signals to a control circuit associated with an outdoor light according to an embodiment of the present invention. A change in a mode actuator or a control actuator is detected at the user interface of a light switch at a step 3202. A control signal is coupled from the switch to the outdoor light at a step 3204. The control signal is decoded at a step 3206. The power applied to the outdoor light is controlled, by a control circuit at the outdoor light, in response to the control signal at a step 3208. The method of FIG. 32 finds particular application with the embodiment of the user interface of FIGS. 11 and 12.

Figure 33:
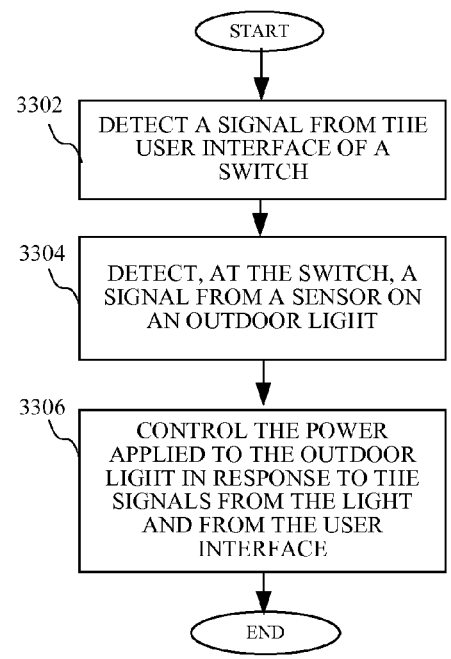
FIG. 33 is a flow chart showing a method of communicating control signals between a control circuit associated with an outdoor light and a control circuit at an indoor user interface according to an embodiment of the present invention.

Turning now to FIG. 33, a flow chart shows a method of communicating control signals between a control circuit associated with an outdoor light and a control circuit at an indoor user interface according to an embodiment of the present invention. A signal from the user interface is detected at a control circuit of the switch at a step 3304. A signal from a sensor associated with the outdoor light is detected at the control circuit of the switch at a step 3302. The power applied to the outdoor light is controlled, by a control circuit of the switch, in response to the signals from the light and from the user interface at a step 3306. The method of FIG. 33 finds particular application with the embodiment of the user interface of FIGS. 13 and 14.

Figure 34:
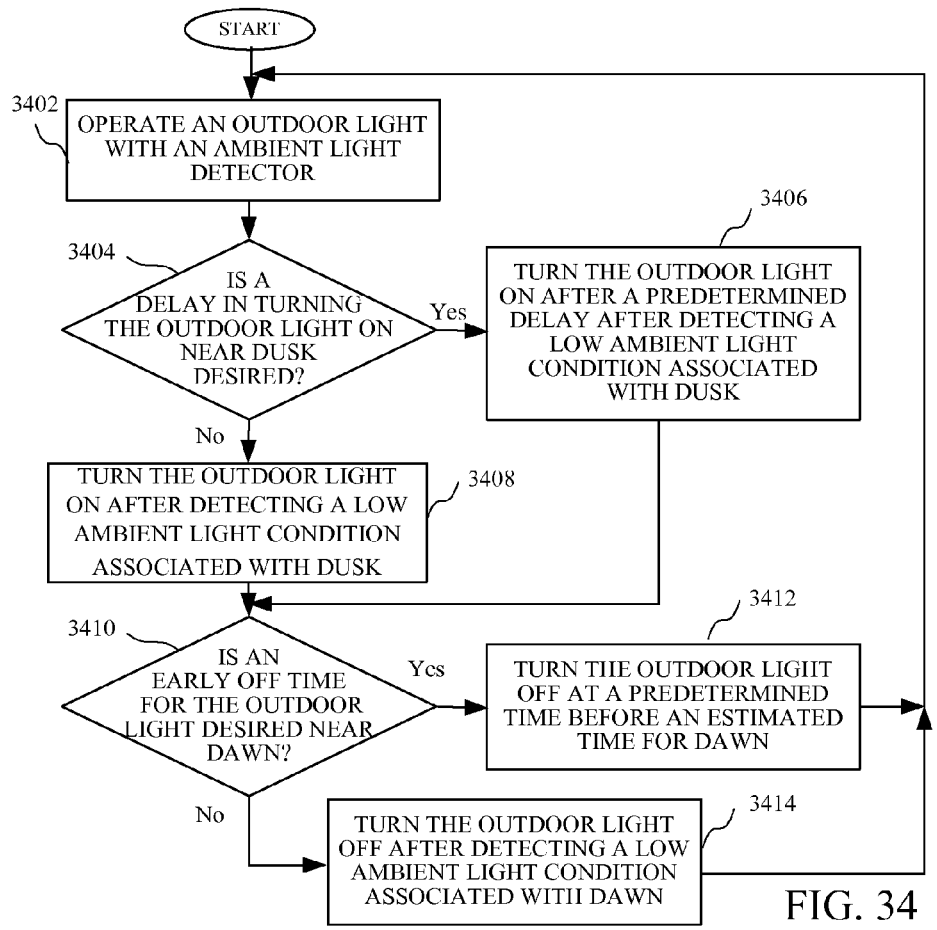
FIG. 34 is a flow chart showing a method of implementing an outdoor light having an ambient light detector according to an embodiment of the invention.

Turning now to FIG. 34, a flow chart shows a method of implementing an outdoor light having an ambient light detector according to an embodiment of the invention. An outdoor light is operated with an ambient light detector at a step 3402. It is determined whether a delay in turning the outdoor light on near dusk desired at a step 3404. If so, the outdoor light is turned on after a predetermined delay after detecting a low ambient light condition associated with dusk at a step 3406. Otherwise, the outdoor light is turned on after detecting a low ambient light condition associated with dusk at a step 3408. It is also determined whether an early off time for the outdoor light is desired near dawn at a step 3410. If so, the outdoor light is turned off at a predetermined time before an estimated time for dawn at a step 3412. Otherwise, the outdoor light is turned off after detecting a low ambient light condition associated with dawn at a step 3414.

Figure 35:
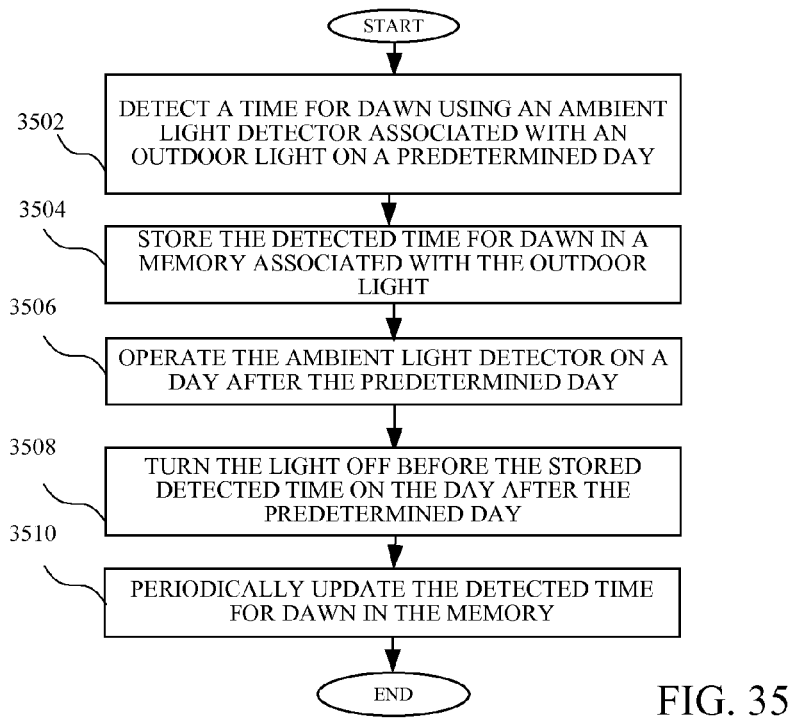
FIG. 35 is a flow chart showing a method of enabling turning off an outdoor light having an ambient light detector before dawn according to an alternate embodiment of the invention.

Turning now to FIG. 35, a flow chart shows a method of enabling turning off an outdoor light having an ambient light detector before dawn according to an alternate embodiment of the invention. A time for dawn using an ambient light detector associated with an outdoor light is detected on a predetermined day at a step 3502. The detected time for dawn is stored in a memory associated with the outdoor light at a step 3504. The outdoor light having the ambient light sensor is operated on a day after the predetermined day at a step 3406. The light is turned off before the stored detected time on the day after the predetermined day at a step 3508. For example, the outdoor light may be turned off according to an early off time as described above in reference to FIGS. 7 and 9. The detected time for dawn is periodically updated in the memory at a step 3510. For example, the estimated time for dawn may be updated daily or weekly, for example, to accommodate the change in sunrise which varies with the seasons.

Turning now to FIGS. 36-40, methods of implementing a timer are shown. The methods of FIGS. 36-40 may be implemented using any of the switches or the program screens of the computer program as described, for example. Although various steps of the methods are described, it should be understood that additional steps could be implemented according to other features and functionality of the timers and program screens as described. It should further understood that the various methods, although shown in different methods, may be employed together.

Figure 36:
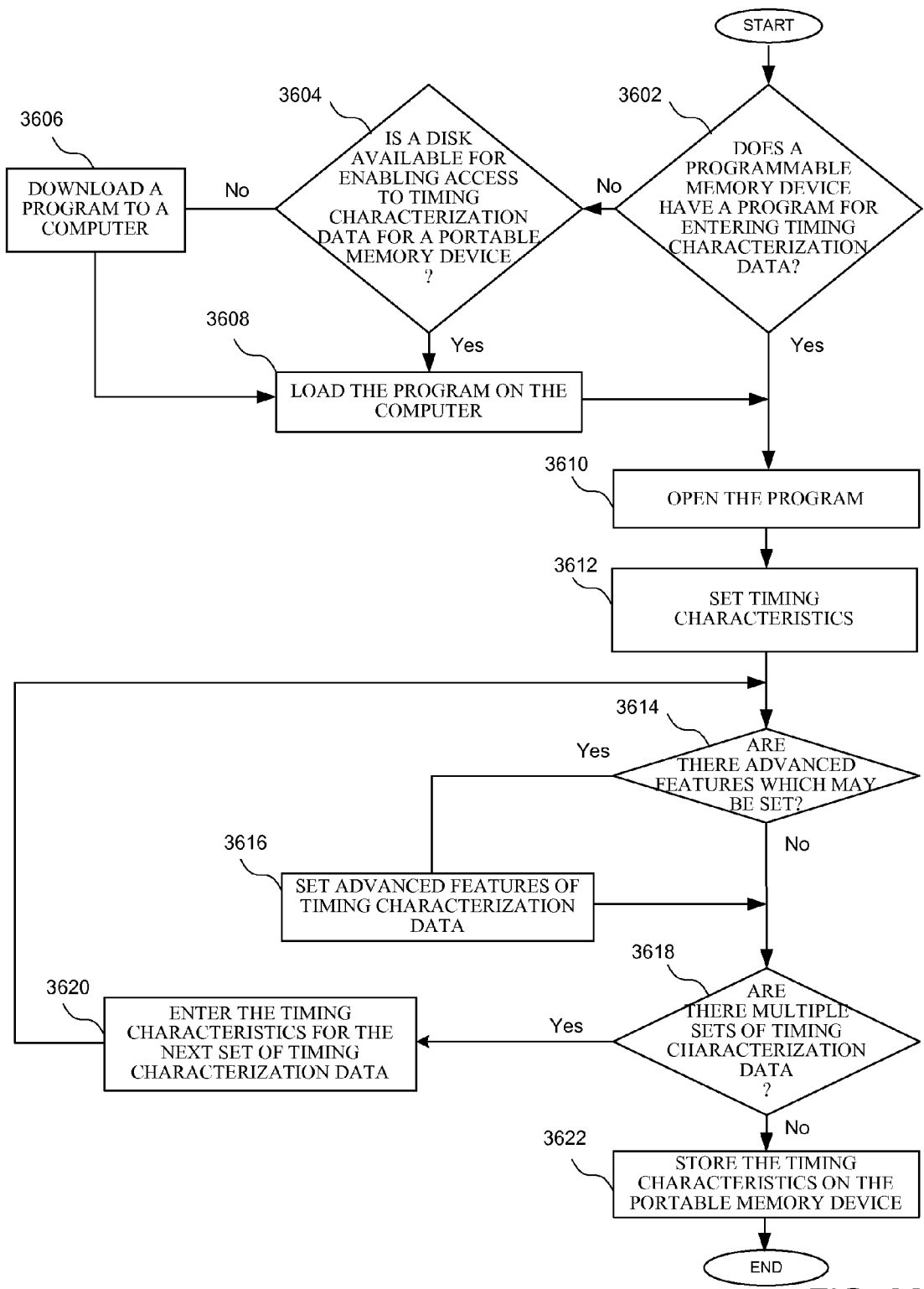
FIG. 36 is a flow chart showing a method of generating timing characterization data according to an embodiment of the present invention.

According to the method of FIG. 36, a flow chart shows a method of generating timing characterization data according to an embodiment of the present invention. It is first determined whether a portable memory device has a program for entering timing characterization data at a step 3602. If not, it is then determined whether a disk is available for enabling access to timing characterization for a portable memory device at a step 3604. If not, a program is downloaded to a computer, such as through an internet connection by way of the communication network at a step 3606. The program is loaded on the computer at a step 3608, and is opened at a step 3610. Timing characterization data are set at a step 3612. It is then determined whether there are advanced features which may be set at a step 3612. If so, advanced features of the timing characterization data are set at a step 3616. It is then determined whether multiple settings are required at a step 3618. If so, the timing characterization data for the next settings are set at a step 3620. If not, the timing characterization data are stored at a step 3622.

Figure 37:
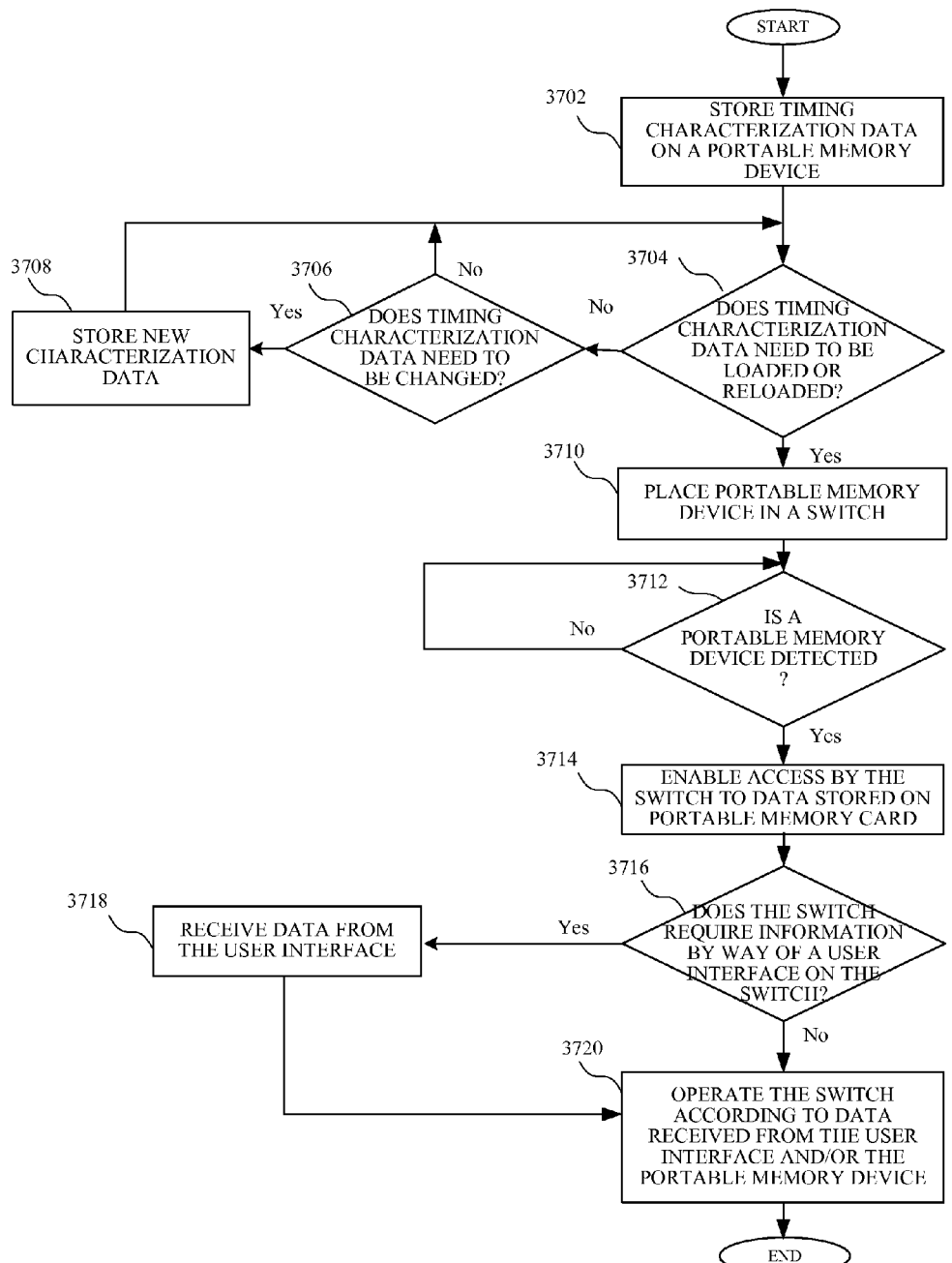
FIG. 37 is a flow chart showing a method of loading timing characterization data according to an embodiment of the present invention.

Turning now to FIG. 37, a flow chart showing a method of loading timing characterization data according to an embodiment of the present invention is shown. Timing characterization data is stores on a portable memory device at a step 3702. It is then determined whether the timing characterization data needs to be loaded or reloaded at a step 3704. It is also determined whether the timing characterization data needs to be changed at a step 3706. If so, new data associated with timing characterization data is stored at a step 3708. A portable memory device is placed in the switch at a step 3710. It is then determined whether a portable memory device is detected at a step 3712. Access by a switch to data stored on portable memory device is enabled at a step 3714. It is then determined whether the switch requires information by way of a user interface on the switch at a step 3716. If so, data is received from the user interface at a step 3518. The switch is then operated according to new data at a step 3720.

Figure 38:
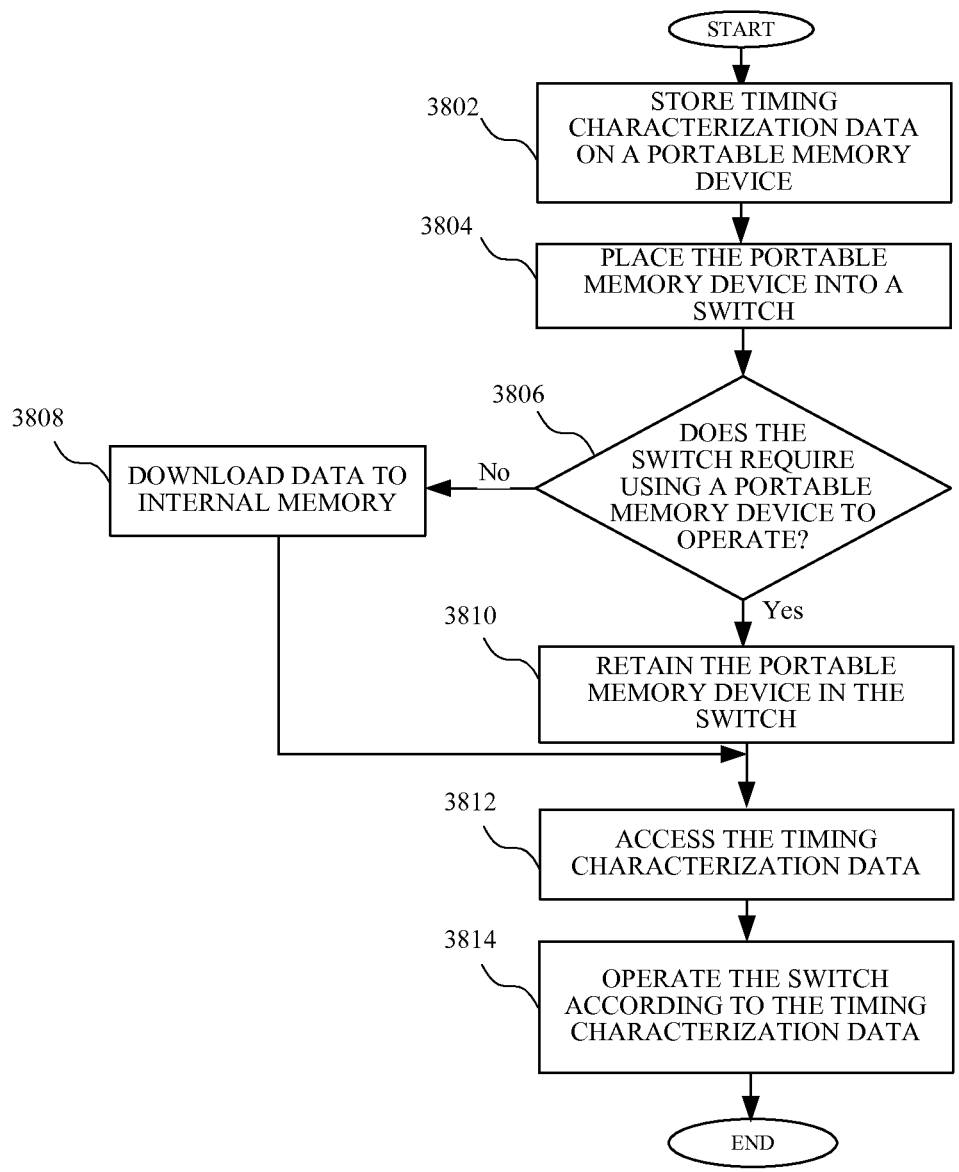
FIG. 38 is a flow chart showing a method of accessing timing characterization data from a plurality of sources according to an embodiment of the present invention.

Turning now to FIG. 38, a flow chart shows a method of accessing timing characterization data from a plurality of sources according to an embodiment of the present invention. Timing characterization data is stored on a portable memory device at a step 3802. A portable memory device is then placed into a switch at a step 3804. It is then determined whether a switch requires using the portable memory to operate at a step 3806. If not, the timing characterization data is downloaded to an internal memory at a step 3808. Otherwise, a portable memory device is retained in switch at a step 3810. The timing characterization data is accessed at a step 3812. The switch is operated according to the timing characterization data at a step 3814.

Figure 39:
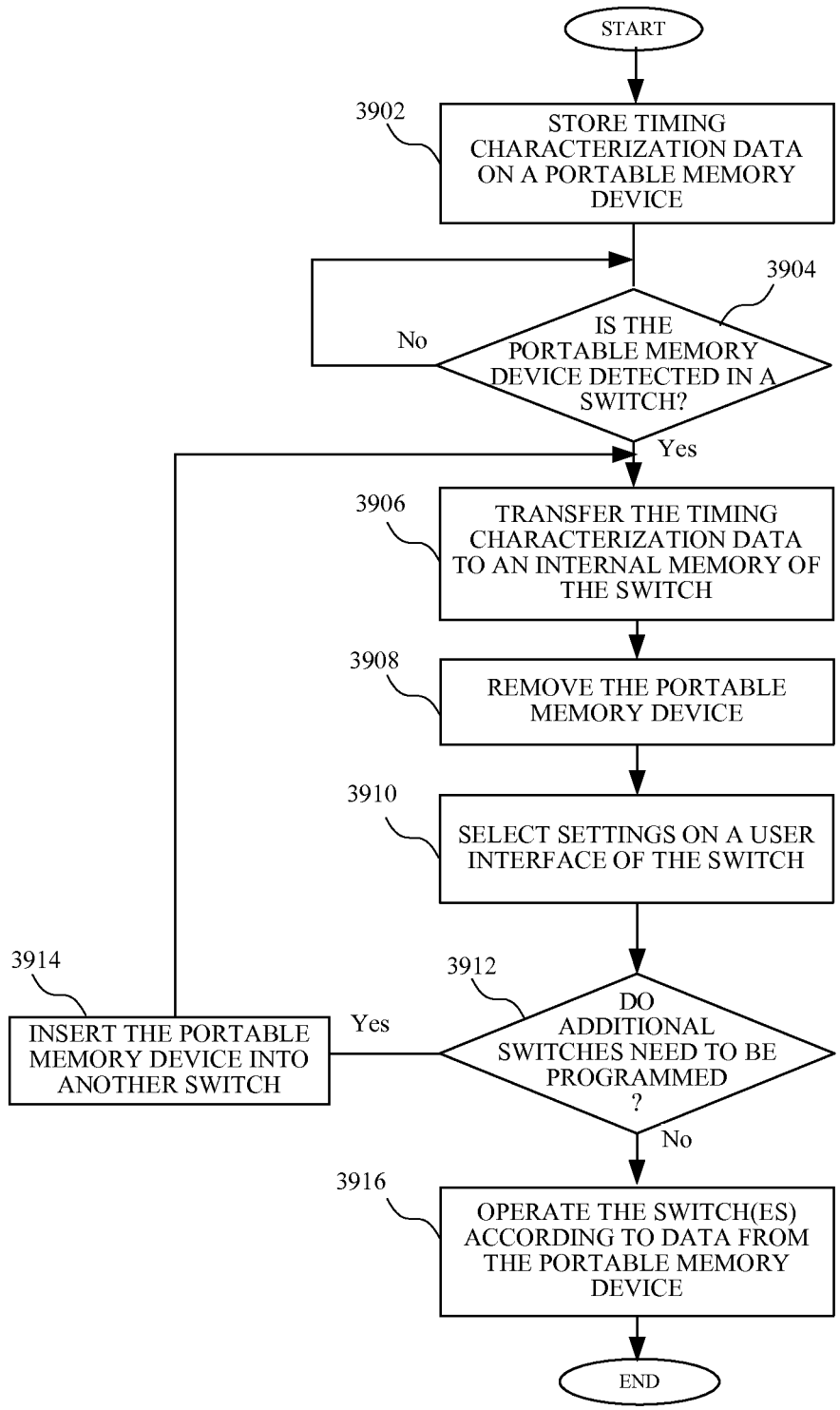
FIG. 39 is a flow chart showing a method of configuring multiple switches according to an embodiment of the present invention.

Turning now to FIG. 39, a flow chart shows a method of configuring multiple switches according to an embodiment the present invention. Timing characterization data is stored on a portable memory device at a step 3902. It is then determined whether the portable memory device is detected in the switch at a step 3904. Timing characterization data is transferred to an internal memory of the switch at a step 3906. The portable memory device is removed at a step 3908. Settings are selected on a user interface of the device as necessary at a step 3710. It is then determined whether additional switches need to be configured at a step 3912. If so, the portable memory device is inserted into another switch at a step 3914. The switch or switches are then operated according to data from the portable memory device at a step 3916.

Because lighting for buildings, including residential buildings, requires such a significant amount of power, the aggregate reduction in power across the world would significantly reduce the amount of energy required to light buildings, and therefore reduce the environmental impact resulting from the production of power to light the buildings.

It can therefore be appreciated that new and novel outdoor light arrangements and methods of implementing outdoor lights have been described. It will be appreciated by those skilled in the art that numerous alternatives and equivalents will be seen to exist which incorporate the disclosed invention. As a result, the invention is not to be limited by the foregoing embodiments, but only by the following claims.

I claim:

1. A user interface for an indoor light switch coupled to control an outdoor light, the outdoor light having a sensor for controlling an on/off state of the outdoor light, the user interface comprising:
    a mode actuator moveable between an off position and a sensor position; and
    a control actuator enabling an adjustment of a setting of the sensor from the user interface, wherein the setting of the control actuator will affect the on/off state of the outdoor light when the mode actuator is in the sensor position.

2. The user interface of claim 1 further comprising a control circuit coupled to the mode actuator, the control circuit comprising an encoder for generating control signals based upon signals from the mode actuator.

3. The user interface of claim 2 wherein the encoder of the control circuit couples the control signals to a decoder at the outdoor light.

4. The user interface of claim 1 further comprising a control circuit having a decoder coupled to receive control signals from the sensor.

5. The user interface of claim 4 wherein the control signals from the sensor comprise encoded signals generated at an encoder at the outdoor light.

6. The user interface of claim 1 wherein the mode actuator is further movable to an on position.

7. The user interface of claim 1 wherein the control actuator comprises an actuator for setting an amount of time that the outdoor light is on in response to a signal from the sensor.

8. A user interface for an indoor light switch coupled to control an outdoor light, the outdoor light having a sensor for controlling an on/off state of the outdoor light, the user interface comprising:
    a mode actuator moveable between an off position, a sensor position, and an on position, wherein the mode actuator enables overriding the sensor when the mode actuator is moved to the on position; and
    a control actuator enabling an adjustment of a setting of the sensor, wherein the setting of the control actuator will affect the on/off state of the outdoor light when the mode actuator is in the sensor position.

9. The user interface of claim 8 further comprising a control circuit coupled to the mode actuator and the control actuator, the control circuit comprising an encoder for generating control signals based upon signals from the mode actuator and the control actuator.

10. The user interface of claim 9 wherein the encoder of the control circuit is coupled to a decoder at the outdoor light.

11. The user interface of claim 8 further comprising a control circuit having a decoder coupled to receive control signals from the outdoor light.

12. The user interface of claim 11 wherein the control circuit is further coupled to an encoder at the outdoor light, the encoder generating a sensor status signal at the outdoor light.

13. The user interface of claim 8 wherein the sensor comprises a motion detector.

14. The user interface of claim 8 wherein the sensor comprises an ambient light detector.

15. A user interface for an indoor light switch coupled to control an outdoor light, the outdoor light having a sensor for controlling an on/off state of the outdoor light, the user interface comprising:
    a mode actuator moveable between an off position and a sensor position;
    a first control actuator enabling an adjustment of the sensitivity of the sensor, wherein the adjustment of the sensitivity of the sensor will affect turning on the outdoor light when the mode actuator is in the sensor position; and
    a second control actuator enabling an adjustment of the duration of an on time of the outdoor light when the mode actuator is in the sensor position.

16. The user interface of claim 15 further comprising a control circuit coupled to the mode actuator and the control actuator, the control circuit comprising an encoder for generating control signals based upon input from the mode actuator and the control actuator.

17. The user interface of claim 16 wherein the encoder of the control circuit is coupled to a decoder at the outdoor light.

18. The user interface of claim 15 further comprising a control circuit having a decoder coupled to receive control signals from the sensor.

19. The user interface of claim 18 wherein the control circuit is coupled to an encoder at the outdoor light, the encoder generating a sensor status signal.

20. The user interface of claim 15 wherein the mode actuator is further movable to an on position.

* * * * *